United States Patent [19]

Bank et al.

[11] Patent Number: 4,823,261

[45] Date of Patent: Apr. 18, 1989

[54] MULTIPROCESSOR SYSTEM FOR UPDATING STATUS INFORMATION THROUGH FLIP-FLOPPING READ VERSION AND WRITE VERSION OF CHECKPOINT DATA

[75] Inventors: Judith H. Bank, 37 Balmoral Dr., Chestnut Ridge, N.Y. 10977; Harry G. Familetti, 15 Hemlock Ct., Fishkill, N.Y. 12524; Charles W. Lickel, 82 Mandalay Dr., Poughkeepsie, N.Y. 12603

[73] Assignee: International Business Machines corp., Armonk, N.Y.

[21] Appl. No.: 934,378

[22] Filed: Nov. 24, 1986

[51] Int. Cl.⁴ .................. G06F 15/74; G06F 11/30
[52] U.S. Cl. .................................. 364/200; 364/134
[58] Field of Search ... 364/200 MS File, 900 MS File, 364/134; 371/10

[56] References Cited

U.S. PATENT DOCUMENTS 4,413,327 11/1983 Sabo et al. .......................... 364/900
4,591,976 5/1986 Webber et al. ..................... 364/200
4,654,819 3/1987 Stiffler et al. ....................... 364/900

FOREIGN PATENT DOCUMENTS 55-41528 3/1980 Japan .
55-115121 4/1980 Japan .
58-31651 2/1983 Japan .

OTHER PUBLICATIONS

Donald Hann "Channel Programming—Reviewing the Basics".

Primary Examiner—Archie E. Williams, Jr.
Assistant Examiner—Thomas C. Lee
Attorney, Agent, or Firm—Joseph A. Biela; William B. Porter

[57] ABSTRACT

An apparatus and method employs dual checkpoint data sets for communicating system status. A journal of changed data is implemented to reduce I/O to a subsystem's shared data area on a non-volatile shared storage device. The journal provides for an increase in the amount of time that a processor may have access to the shared data area. Also, two versions of the data area are implemented in order to insure the integrity of the continuously updated data area. The two versions flip-flop depending upon which one has the most recent updates. That is, the version that has the most recent updates becomes the to-be-read-from data area and is read by the processor that currently has access to the shared data area during this series of I/O operations. The other version becomes the to-be-written-to data area and is written to by the processor that currently has access to the data area in order to update the to-be-written-to version to the current level. The to-be-written-to version then becomes the to-be-read-from version during the next series of I/O operations.

5 Claims, 17 Drawing Sheets

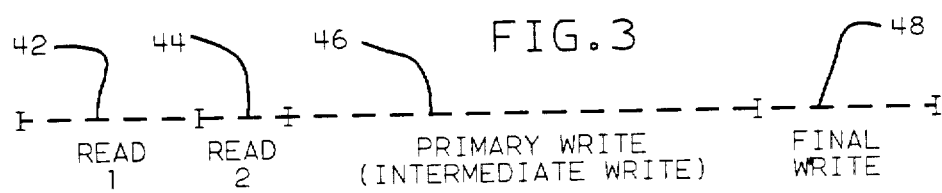
FIG. 3
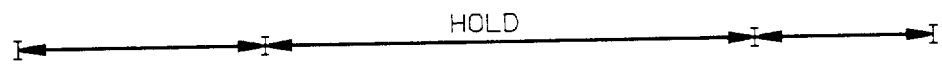
FIG. 15A
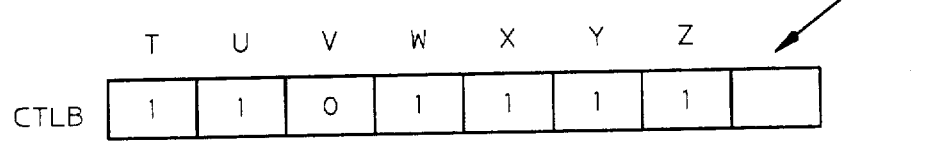
FIG. 15B
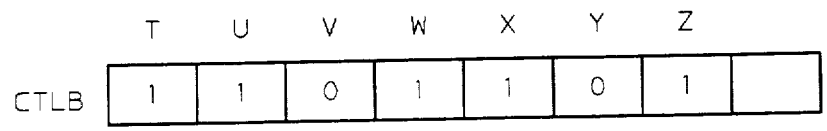
FIG. 15C
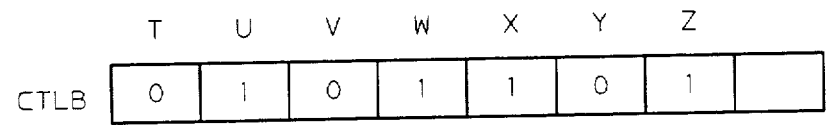
FIG. 15D
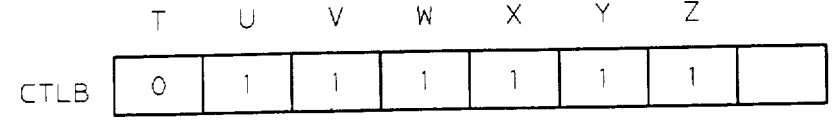

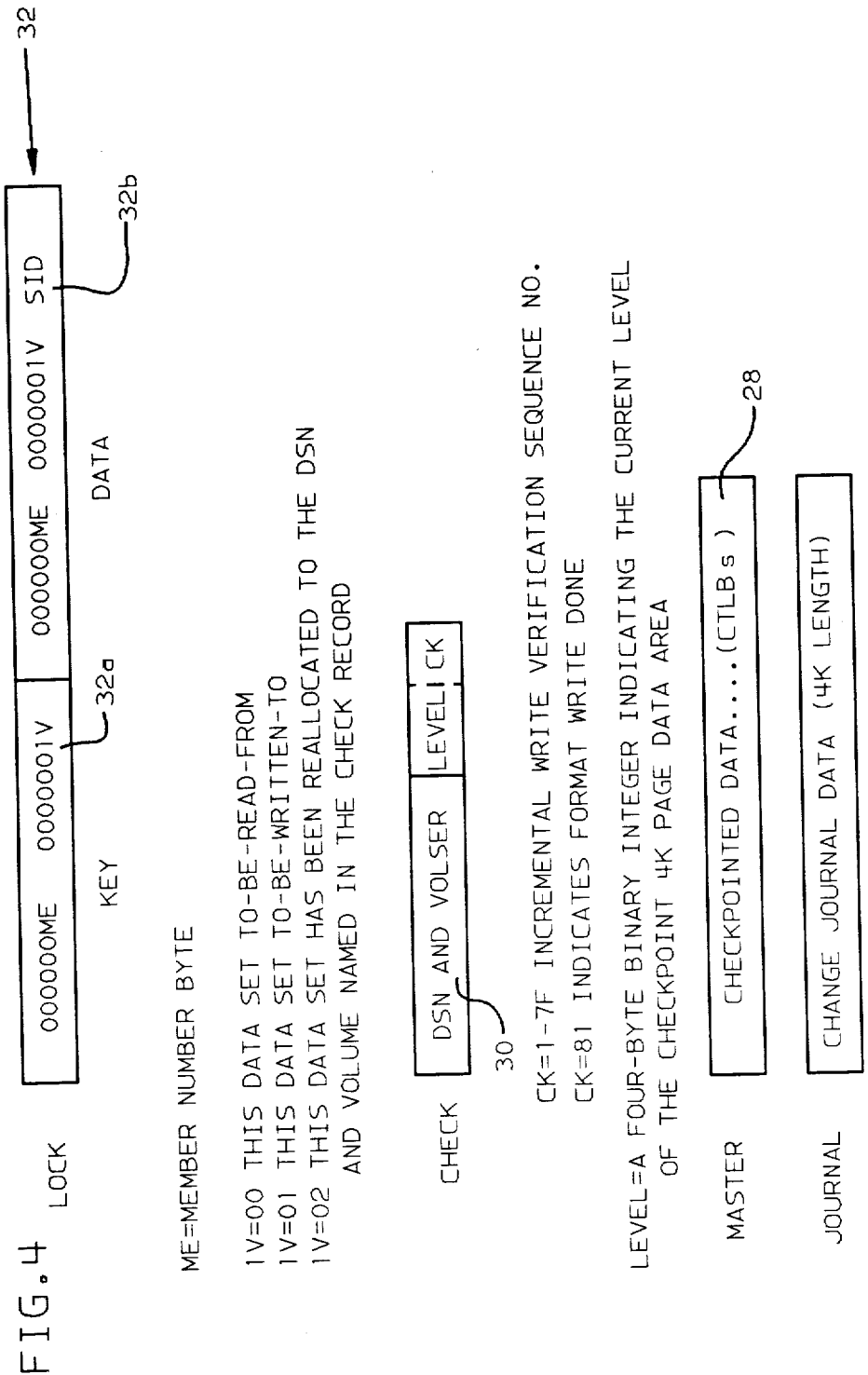

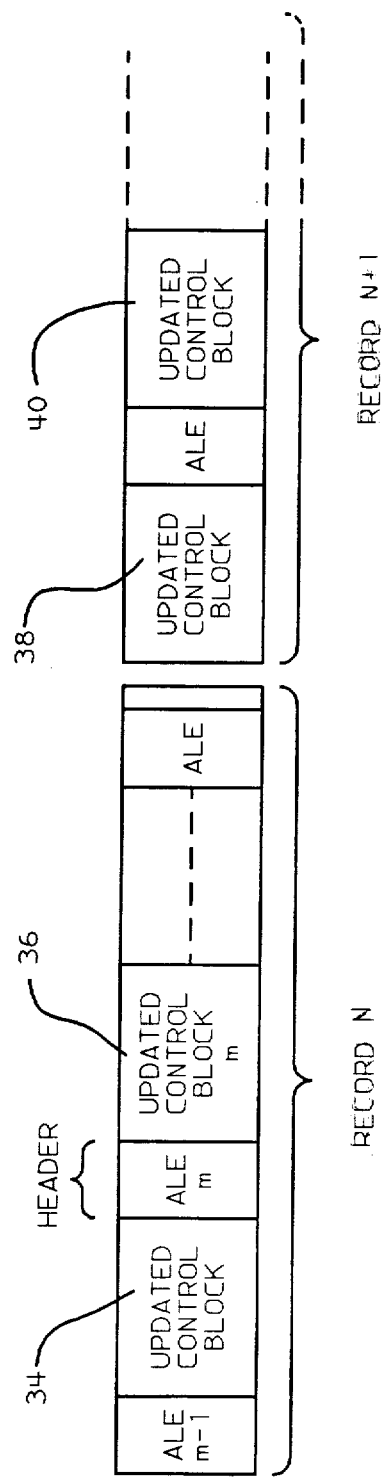

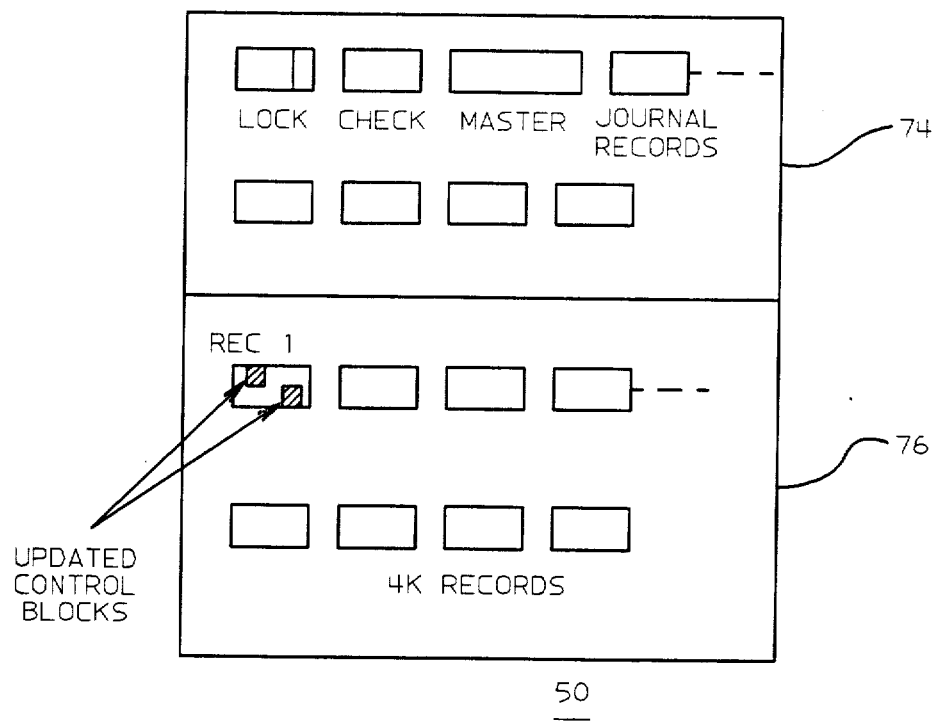
FIG.6 CHECKPOINT DATA SET (IN ADDRESS SPACE)
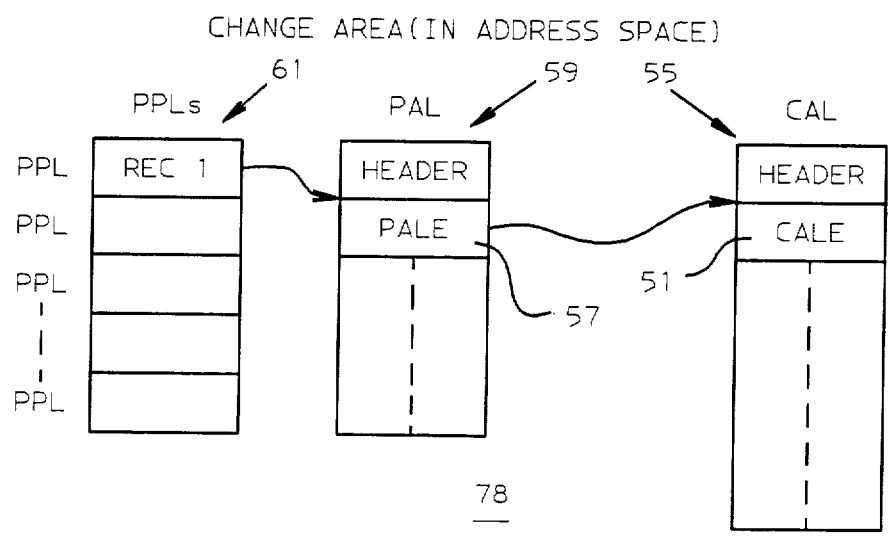
FIG.11

FIG.9

| I/O TIME | CKPT1 | CKPT2 | IN-STORAGE |
|---|---|---|---|
| PRE-READ 1 | JRN 5-4 / 4K PAGE 4 | JRN 6-5 / 4K PAGE 5 | JRN / 4K PAGE 2 |
| POST-READ 1 | JRN 5-4 / 4K PAGE 4 | JRN 6-5 / 4K PAGE 5 | JRN 6-5 / 4K PAGE 2 |
| POST-READ 2 | JRN 5-4 / 4K PAGE 4 | JRN 6-5 / 4K PAGE 5 | JRN 6-5 / 4K PAGE (5-2)+2 |
| POST-PRIM W | JRN / 4K PAGE 6 | JRN 6-5 / 4K PAGE 5 | JRN / 4K PAGE 6 |
| POST-INT W | JRN 7-6 / 4K PAGE 6 | JRN 6-5 / 4K PAGE 5 | JRN 7-6 / 4K PAGE 7 |
| POST-FINAL W | JRN 7-6 / 4K PAGE 6 | JRN 6-5 / 4K PAGE 5 | JRN / 4K PAGE 7 |

MULTIPROCESSOR SYSTEM FOR UPDATING STATUS INFORMATION THROUGH FLIP-FLOPPING READ VERSION AND WRITE VERSION OF CHECKPOINT DATA

BACKGROUND OF THE INVENTION

1. Field of the Invention

This invention generally relates to a multi-access spool computer complex in which the checkpoint mechanism for providing communication among processors in the complex has been improved. In particular, this invention relates to the reduction in input/output to a subsystem checkpoint data set and the increase in the amount of time that a precessor in the complex can update the checkpoint data set.

2. Prior Art

The checkpoint (data set) function has existed since the HASP (Houston Automatic Spooling Program) in the late 1960s. In HASP, and in early versions of the job entry subsystem (JES) following HASP, the first several tracks of direct access storage devices were formatted into special checkpoint records. Periodically, the storage copy of the job and output queues were written to the direct access storage device (DASD), hence the name "checkpoint". Originally the sole purpose of the checkpoint was to maintain a copy of the work queues on the DASD so that the system could be restarted. When the processor was restarted after a failure or normal shutdown, HASP could read the checkpoint from the spool and continue processing as if it was never interrupted. (The "spool" is a space allocated by the JES for containing data related to the jobs to be run and job output.).

Subsequent changes were made such that the checkpoint data set now resides on a shared DASD which is accessible to all the processors in a multi-access spool (MAS) complex. By reading and writing data from/to the checkpont data set, a processor maintains an up-to-date copy of the checkpoint information in its storage. When a processor changes data in the queues, it must reflect the change to other processors via the checkpoint data set.

The MAS complex was introduced with the release of MVS and JES Release 3 in order to permit loose coupling of from two to seven processors (members). In the MAS complex, the checkpoint now serves as the communication pathway bewteen processors (or multiple JES address spaces on one processor) each running asynchronously but cooperatively. Since hardware control over the updating of information was needed, the checkpoint information was moved to a separate MVS data set. In a JES MAS complex, all processors share access to the same set of job and output queues. A job can be read in by any processor, can execute on any processor, its output can be printed or punched by each of the processors, and operators can control jobs anywhere in the complex. Each processor in a MAS complex maintains an in-storage copy of these job and output queues. All processors in the complex are therefore equal in control and in processing responsibility.

As the main mechanism for communication between processors in a MAS complex, the checkpoint data set contains much of the information that JES needs in order to control its functions. Aside from the job queues and outeput queues from which work is selected, the checkpoint also contains a record of member values describing the overall configuration of the MAS environment and specific characteristics and information describing the current status of each member. All of this data is used to control the operation of the checkpoint and related aspects of JES. The checkpoint data set also contains data that the processors in the complex use to "share" the spool space. This includes extent information about the spool volumes which are currently mounted and the bit map from which spool space is allocated. In fact, structures in the job and output queues contain pointers through which all data on the spool volumes are actuatlly located. The checkpoint data set is shared by the members using a time-slicing protocol. Each member is insured the privilege of exclusively updating the data set during the time that it has control of and access to the data set.

As installations grew, the size of their checkpoint data sets also grew and some MAS installations began to experience performance problems related to the amount of time required to perform checkpoint I/O (read/write) operations. JES had to read the entire data set because there was no way of determining which records had been changed by other processors in the complex. As a result, JES could become essentially serialized until checkpoint I/O operation completed. This lead to remote job entry timeouts and slow responses to operator commands. (It was not anticipated that the speed of processors in a MAS would be increased more rapidly than the speed of checkpoint I/O operations.) Also, much of the I/O for the checkpoint data set was unnecessary because many of the records in the job queue and job output table were unchanged. Thus the records being read overlaid identical data already in storage.

The problems were alleviated to some extent with the implementation of control bytes which reside on the checkpoint data set itself for identifying records that were changed. As a result, only the changed records had to be read. The physical format of the data set was changed to consist of fixed length 4K blocks. JES also began using the services of MVS to manage the real storage associated with checkpoint I/O buffers.

Nevertheless, problems with respect to unrecoverable checkpoint failures continued to occur and the amoutn of time required to perform I/O operations was still too great. Clearly JES was incapable of providing adequate error recovery for its checkpoint data set and did not provide efficient communication among processors within a complex. The slowness of checkpoint I/O operations and the loss of the checkpoint data set itself are still major problems in large MAS installations.

Special error detection mechanisms, including unusual channel programming and a philosophy of minimal dependence on hardware error reporting, were implemented. An auxiliary locking mechanism to supplement the shared DASD REVERSE/RELEASE locking facility was invented. A copy of the checkpoint data set was maintained as a backup in case of media damage or other failures. The mechanism for recovery from severe failures if the availability of a backup (duplex) coy of the checkpoint data set. The duplex data set must reside on a separate DASD device from the (primary) checkpoint data set.

JES CHECKPOINT CYCLE

There are four stages in a checkpoint cycle. The first stage beings with a read operation to update the in-storage queues and to ensure exclusive control of the checkpoint data set. The first part of the read operation issues a RESERVE for the checkpoint device and reads control data from the first DASD track. The second part of the read operation reads all of the records that were changed by other members. In the second stage, a member is said to "own" the checkpoint. During this "useful time" it can perform processing on and make updates to the checkpoint data. During this stage, a write operation causes the transfer, to the duplex data set, of all updated records that were not yet recorded on the duplex data set. This is a duplex write. Also during this stage, the member (processor) can cause intermediate update levels (intermediate WRITE) of the checkpoint data to be written to DASD without losing its ownership. At the completion of the "ownership" stage or HOLD interval, the final write of the data set is made and a RELEASE operation is performed which enables the next member to begin the checkpoint cycle. This is the third stage. The fourth stage is a dormant period during which a processor makes no attempt to access the data set and thereby allows other processors time to complete their active phases.

Since the JES checkpoint data set can be accessed by several processors, the RESERVE/RELEASE feature of shared DASD is used to control access to it. When a particular JES system wishes to access the checkpoint, a RESERVE is issued. This allows the member to update the data set until it issues a RELEASE. If another processor attempts to access the device on which the checkpoint data set resides while the first processor is still holding the RESERVE, the second processor will be returned a busy condition to its I/O operation. When the processor holding the RESERVE finally issues the RELEASE for the DASD, an interrupt (device end) is signalled to all processors which experienced the busy condition. At this point, the DASD is unlocked, and the other members can again try to RESERVE it.

There are two basic modes of operating a MAS complex. The most prevalent is in a controlled environment where each processor "gets its turn" owning the checkpoint data set. The other, contention mode, is not recommended. In contention mode, it is possible to allow a processor to compete for the checkpoint at all times, essentially by eliminating the "dormant" period. That is, all processors attempt the RESERVE simultaneously.

CHECKPOINT DATA SET FORMAT

The first track on DASD contains three control records: an 8-byte CHECK record, a LOCK record composed of an 8-byte key field and an 8-byte data field, and the MASTER record. The job queues and output queues are segmented into 4K records which reside on the remainder of the data set. There is a possibility that some portion of the last 4K record in the job queue and in the job output table may not be used, since the sizes of checkpoint structures are rounded to fit into 4K boundaries. The checkpoint data set is a non-sta ndard data set, containing both keyed and non-keyed records.

The CHECK record is an 8-byte record at the beginning of the first track of the checkpoint data set. It contains a check value used to help determine whether the remainder of the data in the checkpoint is valid. That is, it will be used in conjunction with a companion value in another record to indicate whether the previous update operation completed successfully.

The LOCK record is the only keyed record in the checkpoint data set. It consists of an 8-byte key portion and an 8-byte data portion which are identical. It is used as a software lock in addition to the normal hardware RESERVE/RELEASE mechanism. This record is used to control access to the data set.

The JES MASTER record is on the first track of the checkpoint data set. It contains data such as initialization parameters which affect the configuration of the MAS complex, the shared queue control element (QSE) data areas that represent the status of each processor in the complex and the checkpoint control bytes (CTLBs). A copy of the "check" value is in the first part of this record. This copy is compared to the value in the CHECK record during "read" operations to determine whether the records in the checkpoint data set are all at the same update level or state.

CHECKPOINT DATA SET LOCK

The checkpoint data set lock is used as a backup for the RESERVE/RELEASE feature of a shared DASD. RESERVE/RELEASE, by itself, is not an adequate mechanism to guarantee that simultaneous updates will not occur, because it has a tendency to open the lock, unintentionally, when failures occur. The checkpoint data set lock provided by JES, on the other hand, tends to lock closed under these conditions. It will always ensure that the data in the checkpoint data set is good by prohibiting simultaneous updates under any circumstances. Because of this characteristic of locking closed when a failure occurs, this lock requires a manual operation to reset it.

When a processor gets control of the shared checkpoint, it will write a value into the key and data portions of the LOCK record. When the lock is not held by any processor, a value of zero will be recorded. Processors in the MAS complex can determine whether the shared data set is available by using a predetermined channel "search" command (CCW) with a zero data field. If this command is successful, the remainder of a channel program (CCWs) will set the key field to the appropriate value of the processor. The channel program basically performs a "compare and swap" operation on the lock record. See U.S. Pat. No. 3,886,525 which is assigned to IBM, and which discloses and claims the "compare and swap" concept.

The operation to obtain the lock will be done as part of the initial "read" channel program which is executed as each processor's checkpoint interval begins. The initial "read" channel program begins by locating the LOCK record in the checkpoint data set. It then ensures that the lock is currently unowned. If the key of the LOCK record is currently 0 (lock unowned), it then goes on to "read" the MASTER record and the CHECK record. Finally, the initial "read"operation sets the lock by writing the ID of the member that will be owning the lock into the key and data of the LOCK record. If the lock record is currently owned (key of the LOCK record is currently non-zero), the channel program reads the value of the lock record in order to determine which member (processor) owns the checkpoint lock.

When this situation occurs, JES will attempt its own error recovery. If the system which lost the RESERVE is still running, it will eventually clear the key value, allowing the looping members to proceed. If it is not running, a JES operator command will be used by one of the other members to reset the lock value, on behalf of the failed member. Thus this lock can be used as a backup for the RESERVE/RELEASE hardware mechanism, since it tends to lock "closed", rather than "open", when hardware or software failures occur.

CHECKPOINT DATA SET CHECK RECORD

JES is capable of detecting when the checkpoint data read at the beginning of the checkpoint cycle is invalid. If another member fails during a checkpoint update, the data in the primary (as opposed to the backup) checkpoint data set may have been partially updated and is therefore not valid. This occurrence can be detected by using the check value in the CHECK record of the checkpoint data set. Each time that data is written to the checkpoint, an incremented counter (which ranges from 1 to 127) will be recorded in both the MASTER checkpoint record and the CHECK record. All checkpoint write operations will write the counter value in the MASTER record first. Then, after all of the changed queue records have been written, the CHECK record will be written as the last write operation (just before the I/O completion verification). When a member is to "read" the checkpoint data, it first compares the counter value with the check value to determine the integrity of the checkpoint data. If the values are unequal, then one of the other members in the complex must have failed during a checkpoint write operation and error recovery actionis necessary, and always involves a warm start i.e., a restart of JES that retains the work already in the queues.

CHECKPOINT DATA SET I/O OPERATIONS

As discussed above, the checkpoint cycle begins with a read operation to update the in-storage queues (control blocks). Each rad operation is divided into two separate I/Os. The first issues a RESERVE for the checkpoint device and reads control data including the control bytes from the first DASD track. The control bytes (CTLBs) are used to build a channel program to read all of the records that were changed by other members.

In addition to the storage actually used to contain the checkpoint data, JES maintains a checkpoint I/O buffer. During normal checkpoint I/O, actual CCWs transfer data to this buffer. Using the control bytes, JES fixes the real frames associated with the pages in the buffer that will be used. After a channel program has been built and executed, JES moves each of the "read pages" to the appropriate area of the actual checkpoint storage. JES then releases the "old" data in the associated frames (or storage slots on DASD) before "replacing" the data. JES then releases the frames used as an I/O buffer. The above operation is performed in a loop, a page at a time, so that the real frame requirement for the I/O never exceeds by more than one the total number of pages read.

The write operatins performed by the checkpoint processor are substantially the reverse of the read operations. Each page of the I/O buffer that will be used are fixed. For each page in the checkpoint data set that was changed, the storage in the actual checkpoint area is moved to the fixed page in the I/O buffer, and real addresses in the channel program are adjusted. The changed pages are then written to DASD. The pages in the I/O buffer that were fixed are released. It is important to note that entire records are read and written regardless of the number of bytes of data that were changed or modified within the records.

A rather complete discussion of direct access storage devices is found in a book entitled "Introduction to IBM Direct Access Storage Devices" written by Marilyn Bohl and published by Science Research Associates in 1981. This book is incorporated herein by reference. Additional pertinent references include U.S. Pat. Nos. 4,507,751 and 4,310,883, both assigned to IBM.

Faster central processors tend to require more JES services per second than slower ones. This means that the number of checkpoint records updated per second increases with processor speed. This, in turn, increases the unmber of records that must be read by each member of the configuration before useful work can begin. During the time that the data set is being read or written, (except for 'intermediate' WRITES), all updates are prevented. This, in turn, inhibits almost all JES functions because most JES processing requires the ability to update the checkpoint data set.

Some installations find that faster processors are constrained by the inability to complete all of the requested JES functions during the time that the data set is "owned" by a processor. This causes poor response time and inability to fully utilize the processing power of the computer.

It is therefore an object of this invention to reduce I/O to a checkpoint data set and to increase the amount of time that a processor can update the checkpoint data set in order to speed up checkpoint I/O operations thereby increasing the performance of a multi-access spool complex.

It is also an object of this invention to improve communication among processors by speeding up the data set I/O operations.

A further object of the invention is to improve the reliability, availability and serviceability characteristics of the data set.

An object of the invention is to reduce the dependency of the processor executing the subsystem on I/O operations to the data set.

SUMMARY OF THE INVENTION

A method and apparatus for providing improved communication among processors in a multi-plexed data area computer complex is disclosed and claimed. The complex includes processors, main storage with program address spaces, at least one non-volatile storage device connected to the main storage, at least one subsystem in one of the program address spaces and shared data stored in fields in an area in main storage for each processor and program address space.

The improvement is directed to:

a to-be-read-from version of the shared data including a storage area, which has records for containing changed data fields, formatted on a storage device;

a to-be-written-to version of the shared data including another storage area, which also has records for containing changed data fields, formatted on a storage device; and a program in one of the processors or address spaces that performs input/output operations on the versions when one of the processors solely controls and has access to the shared data. The versions then flip-flop following the performance of the input/output operations.

BRIEF DESCRIPTION OF THE DRAWINGS

FIG. 3 shows the events of checkpoint cycle operation involving the dual data set configuration;

FIG. 4 shows the format of a data set to include a journal;

FIG. 5 shows the format of journal records;

FIG. 6 is a schematic diagram showing the records in a data set in storage;

FIG. 9 shows the update level changes to each data set version and to the in-storage copy of the data set for one processor during a checkpoint cycle operation;

FIG. 11 is a schematic block diagram of lists in the change area in virtual storage having entries that are updated each time a corresponding control block is updated by a processor in the complex;

FIG. 15A-D shows how a control byte corresponding to a 4K page that contains control blocks is changed as processor access to the data set changes during a checkpoint cycle operation.

DESCRIPTION OF THE PREFERRED EMBODIMENT

Figure 1A:
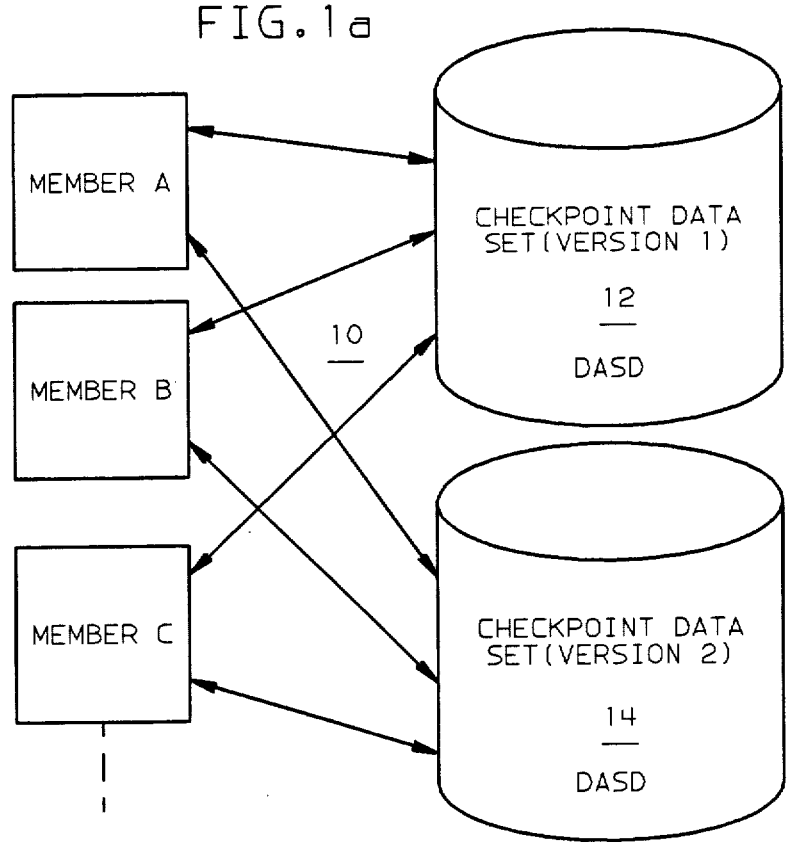
FIG. 1a is a schematic block diagram of the computer complex showing the dual data set configuration.

In accordance with the invention, a journal is implemented in order to reduce input/output (I/O) to a subsystem's shared data area (such as a job entry subsystem (JES) checkpoint data set) on a non-volatile shared storage device such as a direct access storage device (DASD), and to increase the amount of time that is available for data update access to the shared data in fields of main storage by a given member, i.e. a processor, of a multi-plexed data area computer complex as shown in FIG. 1a. To simplify the discussion of the preferred embodiment, the shared data area is a checkpoint data set, such as the one used by the job entry subsystem to provide for communication among processors in a multi-access spool computer complex, and the shared storage device is DASD. Multi-plexed data area means that each member owns the checkpoint at different times. The journal (or change log) is intended to alleviate the overall complex checkpoint constraint by increasing the amount of time that a member may "own" (or "hold" or "have control of and access to") the shared data, i.e. may actually be permitted to update the data residing in the checkpoint data set, relative to the time spent acquiring and relinquishing "ownership" of it. Most useful work can be accomplished only during periods that allow update access, i.e. when a member "owns" and controls the checkpoint data set, excluding the periods of time for acquiring and releasing data set "ownership". Also, in accordance with the invention, a dual data set configuration is implemented (created) to provide the necessary data integrity in case of a DASD or member failure while the checkpoint data set is being updated with the data in the journal. The dual data set configuration (10) is made up of two data sets or two versions (12 and 14) of the same data set on DASD as shown in FIG. 1a. One is a to-be-written-to version and the other is a to-be-read-from version and are further discussed below. There are three coherent copies of the data set, representing its three most recent update levels (discussed below), that can be reconstructed from the versions and associated journals. Two versions allow the writing of updated 4K records to take place at the time of a primary WRITE operation, i.e. during "useful time", rather than during a final WRITE (non-useful time). This increases the useful time available for updates to the checkpoint data set.

"Useful time", in the context of this invention, is the time during which one of the members in the complex is permitted to update the checkpoint data set, and thus to perform functions that require such updates. "Non-useful time" is defined herein to be the period of time during which no member in the complex "owns" the data set (all are "dormant") or a member "owns" the data set but is in the process of performing initial READ or final WRITE operations.

Also in accordance with the invention, the checkpoint data set is read and written in a way that shortens the length of time required for a checkpoint cycle to occur. Fewer bytes of data are read and written during a checkpoint cycle. A checkpoint cycle is defined to begin at the time a member acquires "ownership" and control of the data set. This includes the time that the member takes to read the checkpoint and "overwrite" journal updates in storage, as well as the time that the member takes to write the new "update level" of the data and to reqlinquish "ownership" of the data set. There is reduced I/O to the checkpoint data set during substantially all update accesses by a given member of the complex. Also, the dual data set configuration eliminates the need for a backup (or duplex) copy. Since performance is a primary consideration with respect to checkpoint I/O, the improvement disclosed and claimed herein increases performance substantially over the prior art. For example, in the prior art, if a two member complex had 1.8 million calls to the execute channel program service routine per week, then approximately 16.5 hours of channel time was used per week. Of these 16.5 hours, approximately 3.9 hours were non-useful time due to unnecessary rotations of DASD. This non-useful time has been substantially eliminated. There is no requirement that the versions reside on separate DASD devices, although this is recommended for increased performance.

Figure 1B:
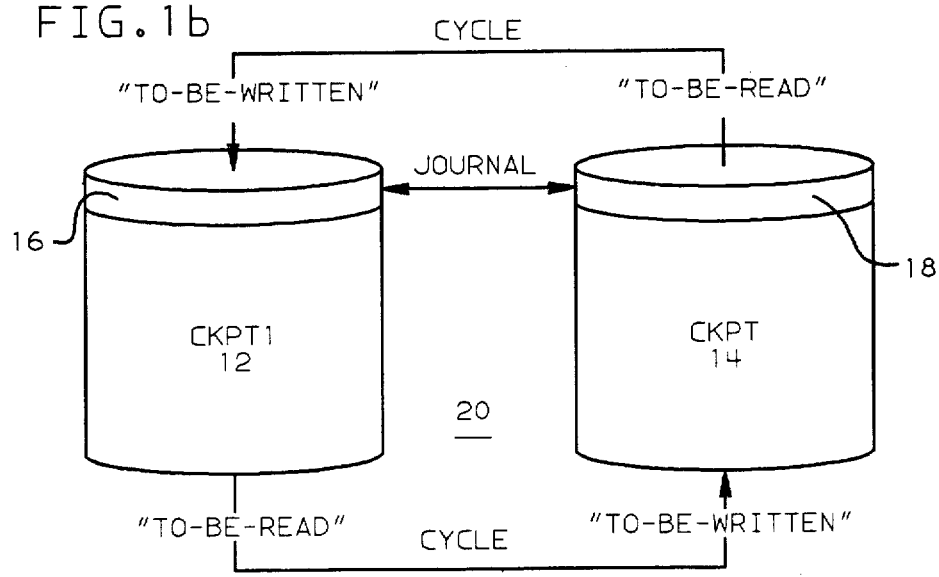
FIG. 1b is a schematic block diagram of the dual data set configuration showing the data set versions and each corresponding journal.

Reduction in the checkpoint cycle time and I/O time is due, in large part, to the new journal portion of each version of the data set shown in FIGS. 1a and 1b. The journal (16) of version 1 (12) and the journal (18) of version 2 (14) are shown in FIG. 1b. As a result of implementing the journal, entire records (each 4096 bytes in length and otherwise referred to as 4K pages) will not be read or written during the checkpoint cycle. Instead, only the changed elements of each record, e.g. a control block or data field or data byte(s), will either be read from or written to the journal portion of the data set on DASD. The journal will be composed of journal records which, like the checkpoint records, are 4096 bytes in length. These records will contain only changed control blocks (each with an average size of less than 100 bytes) and identifying information. The implementation of versions of the checkpoint data set with journal, and the dual data set configuration, does not depend upon current or future DASD technology or features beyond that required for the prior art. FIG. 1b shows conceptually the checkpoint cycle (20) to include a journal (16, 18) in each version (12, 14) of the data set in accordance with the invention.

Figure 2:
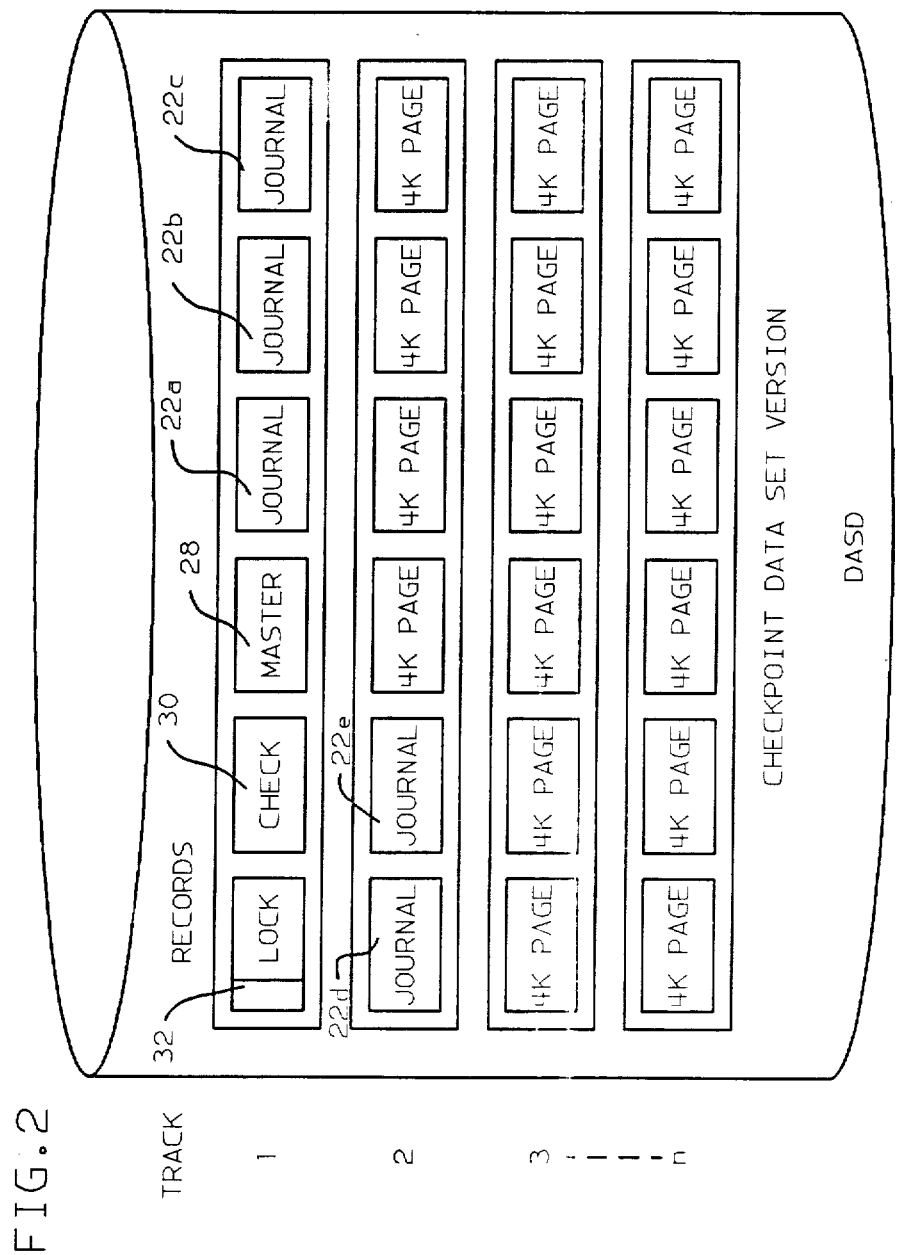
FIG. 2 shows the records in a journal in a data set version as well as other records in the data set version on a direct access storage device.

The main journal area (records which contain the journal data ) is located (formatted) on DASD track 1, immediately following the MASTER record, as shown in FIG. 2, so that it can be read or written in a single I/O operation thereby eliminating the rotational and head positioning delay incurred by the "reads" and "writes" of scattered 4K pages. That is, by placing the journal on the first (DASD) track, the DASD will rotate past the journal's records (22a, 22b, 22c) on the first track in the process of reading or writing records on that track. As shown in FIG. 2, additional journal records (22d, 22e) may be placed on track 2 (and subsequent tracks of the data set) if required. The journal substantially reduces the need to read and write to the checkpoint records that are potentially scattered across multiple tracks and, possibly, cylinders throughout the data set during the non-useful time. As a result, the journal provides for a greater proportion of useful checkpoint update time by a member in the complex. Furthermore, the journal reduces the number of bytes of data that must be read and written to DASD during non-useful time (over the prior art). Therefore, a further reduction in I/O time will be realized even if future DASD technology eliminates rotational delays.

FIGS. 2 and 4 show the checkpoint data set format (data records) in which a journal begins at the end of the MASTER record on track 1 (and may continue to other tracks). In FIGS. 2 and 4, a single block represents an non-keyed data record, and a double block represents a keyed record. The size of the journal is kept in the MASTER record (28), as is the "active" size of the journal. The active size of the journal is given in bytes and is divided by 4096 and rounded up to compute the number of journal records actually in use. The MASTER record also contains a byte of data information corresponding to each record in the checkpoint data set. These bytes are called control bytes (CTLBs) and identify the records in the checkpoint that have been changed or updated since a member relinquished ownership of the data set. Also there are control bytes called CLCBs residing in the subsystem virtual storage address space which identify the changed journal records. The first track of the checkpoint data set includes the CHECK record (30), the keyed LOCK record (32) and the MASTER record (28) as well as all or part of the journal. As shown in FIG. 4 the CHECK record (30) includes the data set name (dsn) and volume number (volser) of a version. The LOCK record key (32a) contains an indication of several new states ("me" "lv") associated with the configuration of the checkpoint data set in dual mode of operation. The LOCK record key is used as a means of preventing data set access in the case of a DASD hardware lock (RESERVE) failure and as a means of determining whether or not to read the entire contents of track 1. ("Ownership" of the authority to change the checkpoint data is controlled using the RESERVE/RELEASE feature of shared DASD. REVERSE/RELEASE also ensures the consistency of the checkpoint data by preventing concurrent updates.)

New records (22a, 22b, 22c) which contain the journal data are formatted onto track 1 following the MASTER record. FIGS. 2 and 4 show the records that are formatted onto the first track of a checkpoint data set in the order in which they are read. The format of journal records is shown in FIG. 5. Journal records are composed of updated control blocks (34, 36, 38, 40) preceded by identifying information in an address list entry (ALE). The control blocks can be variable in length and can span records as indicated by updated control block 38 in FIG. 5. The content of the ALE is identical to the content of the change log address list entry CALE in the change area in storage (which is discussed below).

As indicated above, the checkpoint data set is divided into two versions, CKPT1 and CKPT2, each having a corresponding journal (16, 18) as shown in FIG. 1b. In this embodiment, each version and its corresponding journal resides on a DASD volume or separate storage device. Each member of the complex (shown in FIG. 1a) retains a copy of a "state", i.e. update level, of the data set in the subsystem address space, in this case, the virtual storage address space belonging to JES. The update level of the checkpoint retained by any one member of the complex is based on the status of the data in the checkpoint during the most recent member ownership period. The integrity of the data set is maintained by either of the two versions because it is always possible to reconstruct at least two coherent update levels of the checkpoint from one of the versions and its corresponding journal, and either one or two coherent update levels of the checkpoint from the other versions. Furthermore, if both DASD versions are damaged, it is possible to dynamically allocate new versions and recover from the member's copy of the in-storage data set. The data set is converted to a more recent update level by "overwriting" the data in a version of the data set with the updated data in the corresponding journal. In other words, 4K pages in this version of the checkpoint data set are updated (to an update level) when a member overwrites the journaled changes to the journal's corresponding checkpoint data set version. This occurs immediately following the reading of the data in the previous update level of this version of the data set (on DASD) by a member in the complex. The actual "overwriting" is done to the I/O buffer (shown in FIGS. 10A-10D) whose changed records are written as the "new" update level of the data to the version of the checkpoint data set on DASD during the primary WRITE portion of the checkpoint cycle which is discussed below.

Further, in accordance with the invention, one version of the data set is used on an equal basis as the other version, with the members "flip-flopping" between the two versions (CKPT1 and CKPT2) on alternating checkpoint cycles. Flip-flopping is controlled by using appropriate fields in the data on track 1 of the versions as explained herein. Therefore, this mode of operation is referred to as "dual mode" and the versions are alternately referred to as the "to-be-read-from" and "to-be written-to" versions. That is, if a member uses CKPT1 as the to-be-written-to data set and CKPT2 as the to-be-read-from data set, then the next member to "own" the checkpoint data set will use CKPT1 as the to-be-read-from data set and CKPT2 as the to-be-written-to data set. In essence, the one data set that has the most recent updates will become the to-be-read-from data set. As is shown in FIG. 4 a level number (LEVEL) in the data area of the CHECK record (30) is used to indicate which data set version has the most recent updates, i.e. which data set is to-be-read-from. The other data set becomes the to-be-written-to version. The level number is incremented during each primary WRITE operation. (Primary WRITEs are described below.) The higher the number, the more recent the update. "Flip-flopping" between data set versions eliminates the need for a backup (duplex) copy of the data set.

CHECKPOINT CYCLE OPERATION

(See FIG. 3)

RESERVE: The following discussion of the checkpoint cycle assumes that the DASD hardware lock (RESERVE) has been acquired for a version (CKPT1) by a member of the MAS complex. Once that lock is acquired (implying that no other member holds it), the checkpoint cycle begins for this member. The RESERVE operation ensures that this member has exclusive (sole) control of and access to the checkpoint data set.

READ 1: READ 1 (42) will read the contents of DASD track 1 to include the MASTER record, the LOCK record, the CHECK record, and the journal records that are present on the first track of the to-be-read-from (CKPT1). The journal corresponding to CKPT1, at this point, contains the control blocks that have changed from a low update level to a high update level. In this example, CKPT1 has the highest (most recent) update level. The MASTER record is used to determine which records must be read to obtain changed records from prior update levels and which of the versions is at the highest update level. (READ) 1 transfers approximately 600 percent more data from a DASD version into virtual storage over the prior art READ 1 due to the implementation of the journal.)

READ 2: READ 2 (44) will read additional active journal records if any (in addition to those read during READ 1), and will read the 4K data records in CKPT1 that have been changed, if any. That is, this member will read the low level updates in the 4K pages on CKPT1 on DASD. These changed records "overwrite" prior data in this member's checkpoint data set (via the I/O buffer) in the subsystems address space so that the data set in storage is now at the high update level. The number of bytes transferred to the member's in-storage checkpoint data set during READ 2 is generally less than in the prior art READ 2. This is due to the fact that some of the updates that would have been in the checkpoint records on DASD have already been read (READ 1) because they were contained in the journal. The journal's high level updates, read during READ 1, overwrites control blocks in the in-storage data set. Specifically, only those control block modifications that were made by the member that "owned" the data set in the preceding checkpoint cycle, and that have already been read during READ 1 and READ 2, now overwrite the corresponding control blocks in the 4K records of the in-storage data set. READ 2 is now n percent faster than in the prior art (where "n" is a function of the number of members and the number of records updated). In a complex composed of only two members, READ 2 is normally entirely eliminated.

Primary WRITE: The primary WRITE (46) will write 4K records to the down-level version (in this example CKPT2) in order to bring it to the current high level, i.e. the one having the most recent updates. That is, the records that have been marked as changed since the last update of the down-level (non-current) version, either as a result of the data in the journal or the data transferred during READ 2, are written to the down-level version on DASD during the primary WRITE operation. This period is composed of "useful time", and new updates (or changes) in progress, i.e. to control blocks, for the member that "owns" the data set are recorded in a "change area" in the subsystem storage space. The "change area" (52) is shown in FIG. 11 and is further discussed below. This area in storage will be used to construct the next journal, which will be written to a version on DASD during the final or intermediate WRITE operations. The checkpoint data set area (50) in storage is shown in FIGS. 6 and 10A–10D and is further discussed below. For the complex in dual mode, the primary WRITE which follows READ 2 will be made to the to-be-written-to checkpoint version.

The time interval for a primary WRITE is depdent on the number of checkpoint records that have been previously updated by more than one member. The amount of data tha must be written during a primary WRITE is determined by the number of changed records in the journal. Records that have been updated by multiple members of the complex need only be written to the to-be-written-to version once.

Intermediate and final WRITES:

For the complex in dual mode, the intermediate and final WRITES (48) will be made to the to-be-written-to checkpoint version. The intermediate and final WRITES will write journal records from the in-storage checkpoint data set to DASD containing only those control blocks which have been updated since the last checkpont (primary) WRITE. The journal in the checkpoint data set contains about five percent of the data in the changed records.

The times during which a particular member has control of the data set, and yet does not "own" the checkpoint (and thus can do no useful work), are during READ 1, READ 2 and the final WRITE. If a complex uses dual mode, the time required to perform the final WRITE (non-useful time) will be considerably reduced since only changed control blocks will be written to the to-be-written-to version, and thus more time can be spent doing useful work. The time required to perform a READ 2 will also generally be reduced since some of the updates ordinarily read during READ 2 have already been read, and will thus induce a similar increase in the amount of time spent doing useful work. The time during a primary or intermediate WRITE is useful time because the primary and intermediate WRITE occur during a member "ownership" period as shown in FIG. 3. As an additional benefit, a substantial portion of the load on the I/O channel is reduced during the intermediate WRITE interval.

Usually, in the prior art, only about two to five percent of the bytes in a 4096 byte record are updated at the time it is written. Therefore, the journal contains a fraction of the data that would have otherwise been written by a member, and read by the other members, in the complex. Generally, useful time is increased by shortening READ 2 and the final WRITE portions of the checkpoint cycle, during which updates by the owning member, as well as by all other members, are locked out (non-useful time).

A "HOLD" period (as shown in FIG. 3 and discussed below) begins following the completion of READ 2 and just prior to the primary WRITE operation. This portion of the cycle is composed entirely of useful time. Following READ 2, the updates contained in the journal and in the records transferred during READ 2 are copied from the I/O buffer to the checkpoint data set residing in the in-storage area or, in this embodiment, the JES address space (see FIG. 10B). This is the latest version of the checkpoint because all changes to the data set since the last (member) ownership period have been seen during a READ 1 and READ 2.

OPERATION OF CHECKPOINT CYCLES WITH MULTIPLE PROCESSORS

FIGS. 7a–7d provide an example of the flow of checkpoint data and control of the data set when the complex is in dual mode. In accordance with the invention, this flow depicts the use of the journal in dual mode, which did not exist in the prior art, and the progression of versions, update levels, and in-storage checkpoint data set copies in a 4-processor multi-access spool complex.

In FIGS. 7a–7d, the term "jrn x-y" is a journal in a version which contains the changed control blocks that would update (low) level y to (high) level x. The term "lev x" represents a version of the data set, i.e. the 4K records and the track 1 records (other than the journal), which is at update level x. The term "owner" indicates which member's id is in the LOCK record for showing ownership of the data set. Note that only the indication in the LOCK record of the "to-be-read-from" version is used to show ownership, and that the areas in the versions are not drawn to scale.

Figure 7A:
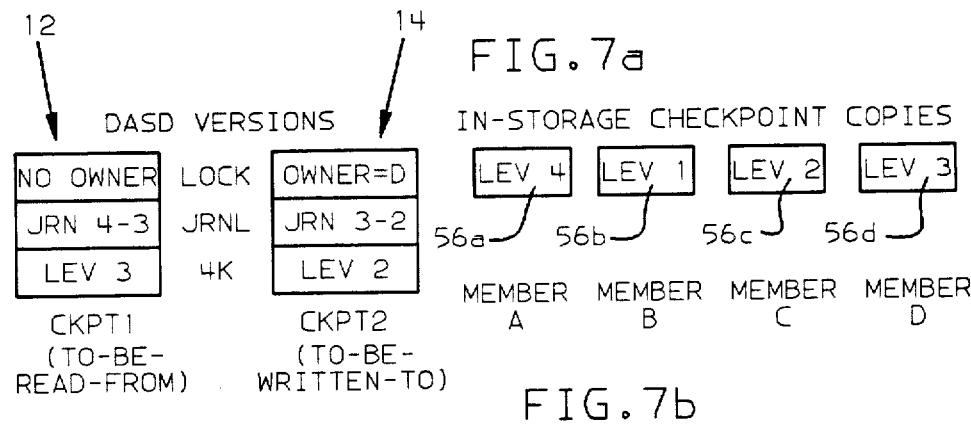
FIGS. 7a-d show the progression of data set versions, update levels and in-storage data set copies in a four-processor complex during the operation of the checkpoint cycle.

FIG. 7a shows the DASD versions (12, 14) and in-storage checkpoint copies 56a–d after member A has finished its final WRITE to the to-be-written-to checkpoint version. The following describe the actions taken by member B (during non-useful time) unless otherwise indicated:

1. Acquires CKPT1's RESERVE.
2. Performs parallel READ 1 operations on CKPT1 and CKPT2 on DASD, resulting in CKPT1 (the to-be-read-from version) being locked for member B, and in loading of CKPT1 jrn (journal) updates (4-3) and CKPT1's MASTER record. In other words, the journal associated with CKPT1 contains the control blocks that would update the data set from (low) level 3 to (high) level 4.
3. Reads data in the MASTER record to determine which 4K pages to read from CKPT1's level 3 to get the changes effected by previously existing journal levels (2-1) and (3-2).
4. READ 2 is performed on CKPT1 to read those 4K pages, which are used to overwrite member B's in-storage (data set) 4K pages to update from level 1 to level 3.
5. Journal (4-3), which was read in READ 1, is then used to overwrite some control blocks (not records) in the (currently) level 3 I/O buffer and in-storage data set area to update it to level 4.

Figure 7B:
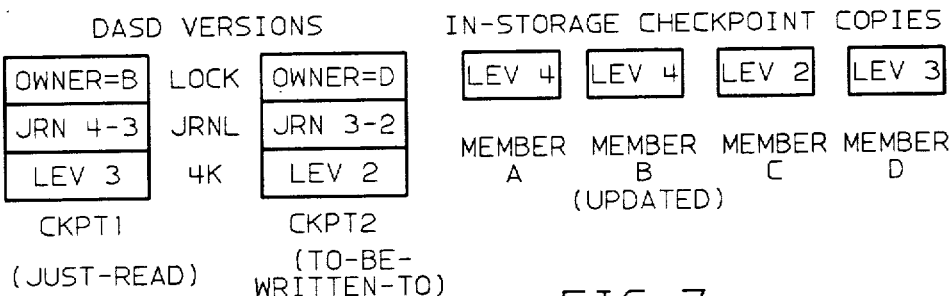

FIG. 7b shows the DASD versions and in-storage checkpoint copies after member B has finished READ 1, READ 2 (and READ 2 post-processing). The following describe the actions taken by member B (during useful time) unless otherwise indicated:

1. Executes a primary WRITE to CKPT2 for all pages updated after level 2 (updates the CKPT2 version 4K area from level 2 to level 4). The "write" puts data from the I/O buffer area to DASD, and results in CKPT2 being locked for member B.
2. During this time, the in-storage change area is updated by various subsystem functions performing useful work for member B, i.e. updated queues and other control blocks.

Figure 7C:
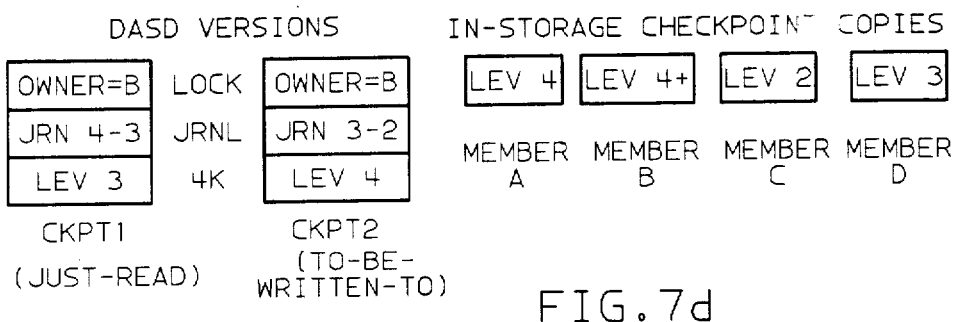

FIG. 7c shows the DASD versions and in-storage checkpoint copies after member B finished a primary WRITE. The following describes the actions taken by member B (during useful time until the start of the final WRITE) unless otherwise indicated:

1. Continues to perform useful work, occasionally initiating an intermediate WRITE to write interim levels of jrn (5-4) to member B's in-storage copy of CKPT2. Note that the journal (jrn) contains only updated control blocks rather than entire contents of updated records. During this time, the in-storage data set copy is updated to corresponding interim level 4+.
2. After the HOLD time value has expired, a final WRITE is initiated to write the final level of jrn (5-4) in the in-storage area to the CKPT2 journal on DAS (lev 5), and to clear the LOCK records.

Figure 7D:
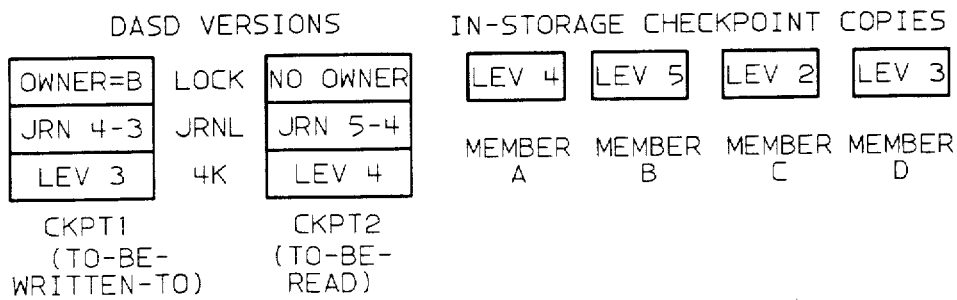

FIG. 7d shows the DAS versions and in-storage checkpoint copies after member B has finished its final WRITE. The following describes the actions on member C, member D, etc:

1. The steps described above are repeated on other members to update their in-storage levels, to accomplish useful work, then to perform a final WRITE to let the next member do the same. Note that the update levels of the CKPT1 and CKPT2 data set have "flip-flopped". That is, CKPT2 is at the most current update level and is now the to-be-read-from version.
2. There is no requirement for the members to repeat their ownership times in the sequence as shown (first A, then B, etc). The acquisition of the RESERVE on CKPT1 for the next ownership period utilizes a combination of a time interval during which a member purposely remains "dormant", followed by "contention" with any other member that may want to also acquire the RESERVE. The prior art taught against placing members in "contention". See, for example, the IBM Technical Bulletin entitled "The JES2 Checkpoint Mechanism", GC22-9220-00, which is incorporated herein by reference.

Figure 8:
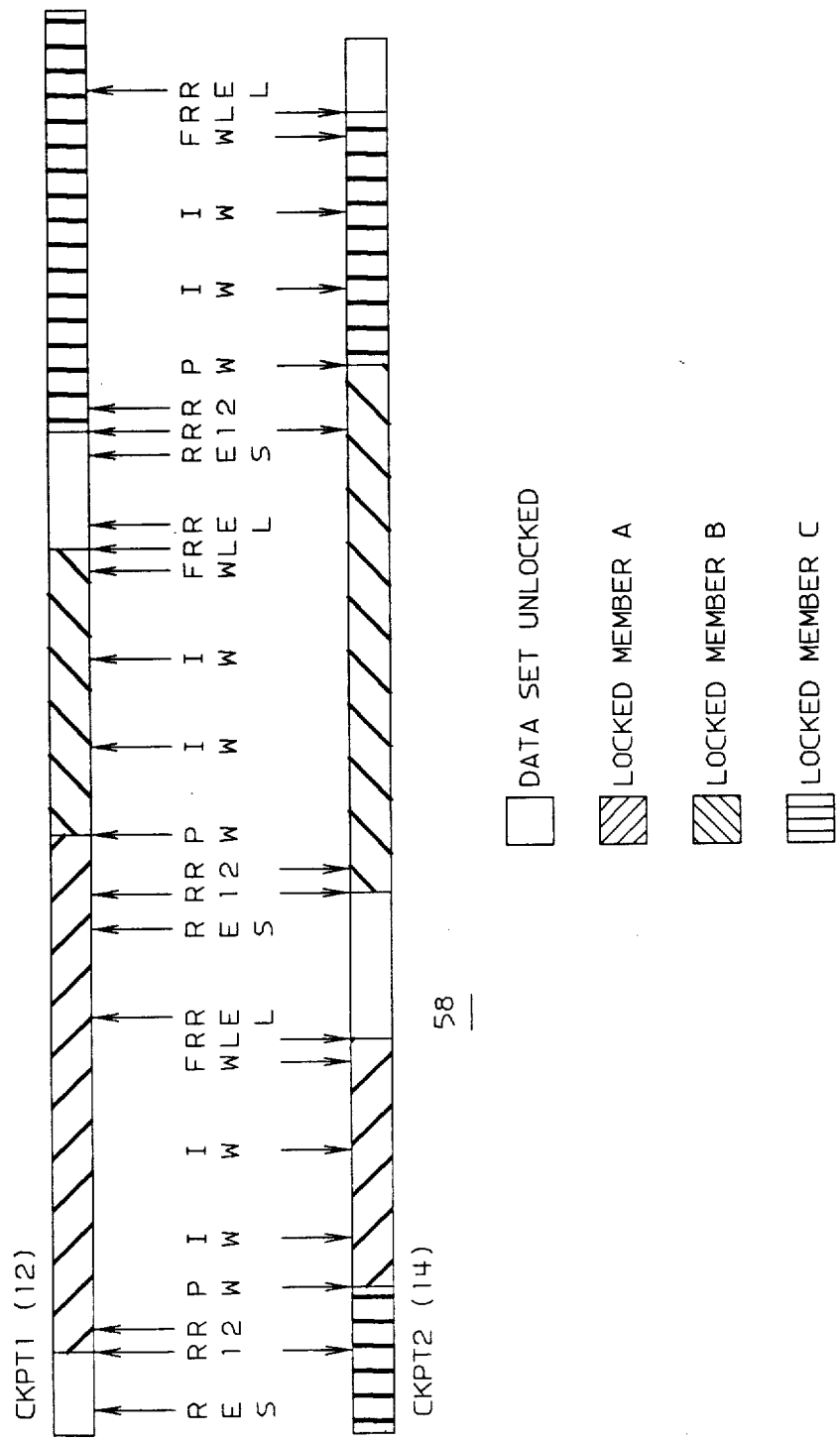
FIG. 8 shows the events of the checkpoint cycle involving the dual data set configuration as each of three processors gains control of and has access to the data set verions.

FIG. 8 shows "time line" 58 of the checkpoint cycle (with three members) to include the RESERVE (RES), READ 1 (R1), READ 2 (R2), primary WRITE (PW), intermediate WRITE (IW), final WRITE (FW), release of the lock (RL) and RELEASE of ownership of the data set (REL). CKPT1's RESERVE is acquired. CKPT1 is locked for member A at R1. Member A then performs a READ 2 (R2) function on CKPT1. Member A then performs a primary WRITE (PW) to CKPT2. Following the final WRITE (FW) of the in-storage journal to CKPT2, the locks are RELEASED. CKPT2 is then, in this case, locked for member B following a READ1 function and the above functions are repeated for member B (and then member C).

FIG. 9 shows the update level changes to CKPT1, CKPT2 and the in-storage copy of the data set for one member during checkpoint cycle processing. The "I/O TIME" column 58 indicates the stage (and substage) of the checkpoint cycle such as primary WRITE (PRIM W) and each row 60a-f indicates the update level of each representation of the checkpoint data set. The entries in the CKPT1 and CKPT2 columns indicate the update levels of the checkpoint versions on DASD at each stage of the checkpoint cycle. The entries in the in-storage column indicates the update level of the checkpoint data set in the virtual storage of the subsystem (JES) address space. For example, two update levels are indicated in box 62: the journal update level (JRN 6-5) and the update level (level 2) of the 4K page of the data set. JRN 6-5 is a journal in the in-storage copy of the data set that contains the changed control blocks that would update level 5 to level 6. The 4K page in the in-storage copy of the data set is at update level 2.

FURTHER DETAILS ON THE CHECKPOINT CYCLE READ 1 PROCESSING

The READ 1 processing is invoked during the normal checkpont cycle by the checkpoint processor. The checkpoint processor is comprised of a dispatchable unit called a PCE together with the code that is executed when it is dispatched. This code is contained primarily in the HASPCKPT and HASPCKDS modules which reside in the JES address space. READ 1 processing is performed by the KREAD 1 routine in HASPCKPT. The function in KREAD1 are translated into the channel program (described below and shown in FIG. 12a) built for the reading of track 1.

The KREAD1 routine is invoked to acquire the most recently updated version of the checkpoint data set. This is accomplished using hardware and software "locks". The hardware lock is set with a RESERVE channel control word (CCW). Specifically, the KRESERVE routine in the HASPCKDS module is invoked by the KREAD1 routine in HASPCKPT to acquire the hardware lock for the CKPT1 version of the checkpoint data set. This is accomplished by issuing a RESERVE request, which prefixes the next channel program with a RESERVE CCW. KREAD1 then calls the KNOP routine, which executes a channel program that causes the hardware RESERVE to be initiated. If the I/O operation is successful in obtaining the lock, the DAS control unit hardware will prevent any other processor in the complex from initiating I/O to that DASD.

The hardware lock is acquired only for the CKPT1 version and is used to serialize I/O to both checkpoint versions.

The KREAD1 routine also initiates I/O to both checkpoint versions (when operating in dual mode). The routine examines the processing control flags to determine which is the most recently updated checkpoint version. This version is the to-be-read-from data set. The KREAD routine calls KTRK1IO.

Input to the KTRK1IO routine consists of pointers to the checkpoint I/O control blocks (CKBs), pointers to the LOCK record key, and a set of processing control flags.

Figure 12A:
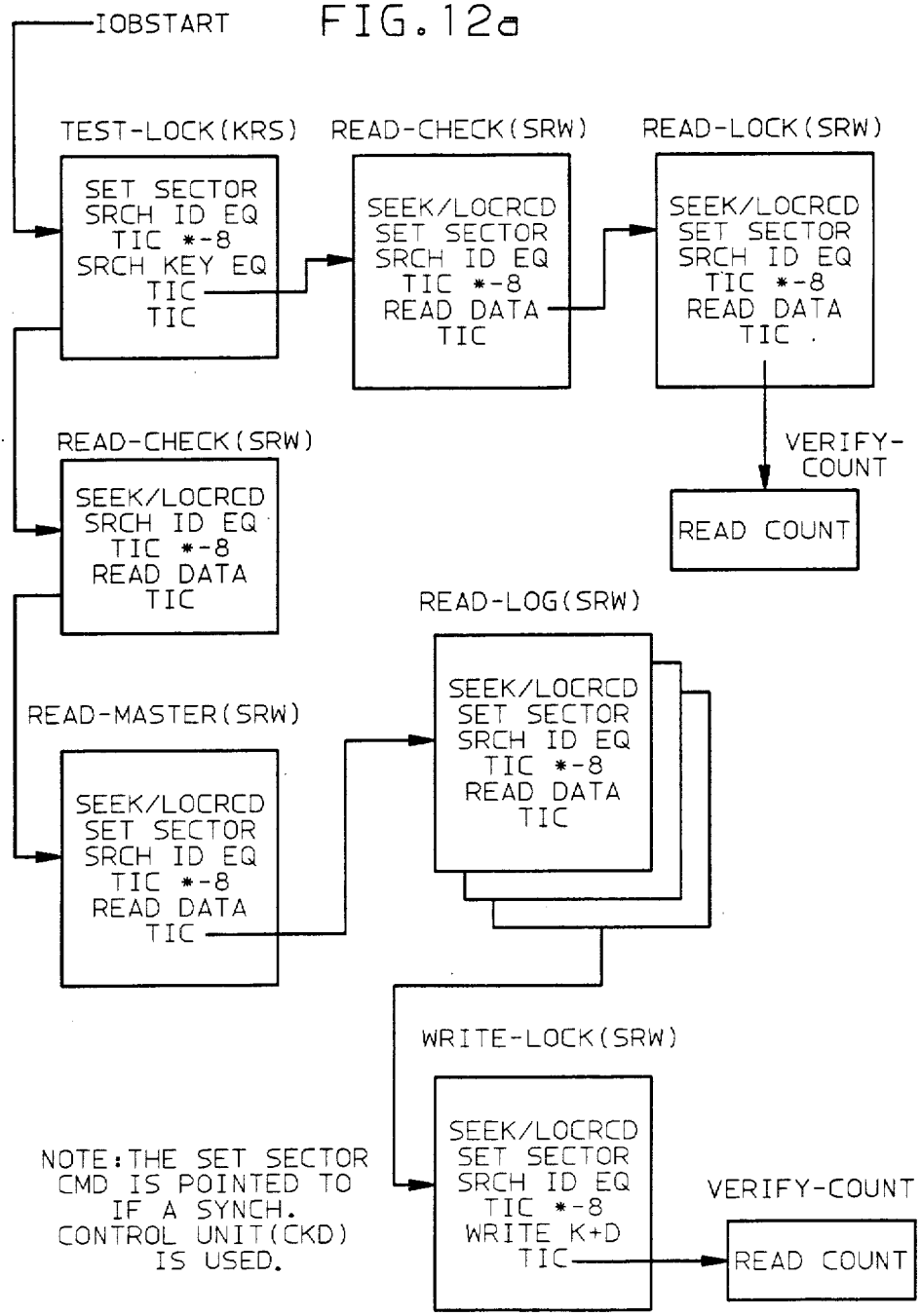
FIG. 12a is a flow chart showing the READ 1 processing operation.

The KRTK1IO routine (in HASPCKPT) processes a member's read request by first setting the CKB IOBs and channel program packets to the structure indicated by the input control flags. (The channel program will always be built to include reading of record 2 (the CHECK record) from the data set(s) indicated by the read control flags. The required I/O(s) are then initiated via EXCPVR requests. FIG. 12a shows the channel program that initiates the checkpoint I/O. EXCPVR is a service routine that causes execution of the channel program passed to it by the requesting member.) Upon completion of the I/O request(s), any I/O errors and/or the status of the "read" completion(s) are determined. The final "read" completion status and an indication of the data set(s) that were read is returned to the caller via a return code and status flags. If the "read" was successful, the in-storage checkpoint data set in the subsystem, i.e. JES, virtual storage space contains the data read from the data set on DASD. If the "read" was not successful, an error could have occurred when reading the CHECK record, or the MASTER record, or the LOCK record, or when searching for the LOCK record key or when writing the LOCK record for the data set. An error could also have occurred when reading the journal for the data set.

The KREAD1 routine will read the journal records corresponding to a checkpoint version on a first DASD track. These records are read in the same channel program as the MASTER, CHECK and LOCK records to take advantage of the fact that DASD must rotate past these records during its normal operation.

READ 1 PROCESSING

Figure 10A:
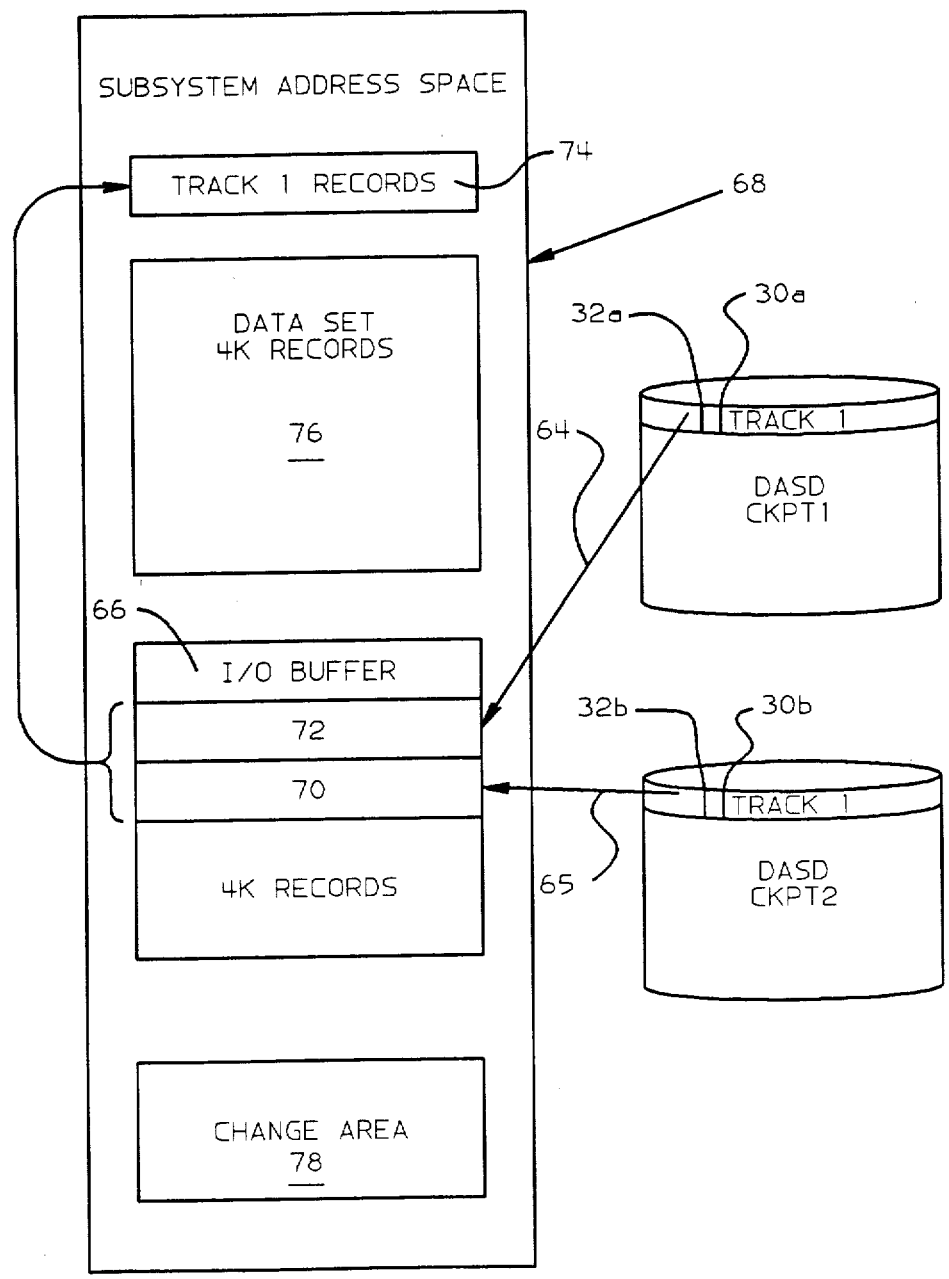
FIGS. 10A-D shows the events that occur on the direct access storage device and in virtual storage during READ 1 processing, READ 2 processing, primary WRITE processing and intermediate and final WRITE processing during a checkpoint cycle operation.

FIG. 10A shows conceptually the events that occur during READ 1 processing. First, parallel I/O occurs which copies some or all of the data (as indicated by lines 64 and 65) in each version on DASD to the I/O buffer (66) in the subsystem's virtual address space (68). The channel program determines, by reading the LOCK (32a, b) and CHECK (32a, b) records, which version will become the to-be-read-from version. Then, data from the to-be-read-from version is stored in the first track region 70 of the I/O buffer and the LOCK and CHECK record data from the to-be-written-to version is stored in another region 72 of the I/O buffer. Second, the track 1 records in the in-storage checkpoint data set are updated when the data in each region (70, 72) in the I/O buffer are copied to the track 1 records 74. Third, the member currently "owning" the data set reads the control bytes (CTLBs) in the in-storage MASTER record (in track 1 records 74) to determine which records have been changed and, therefore, must be read from the to-be-read-from version during READ 2 processing. Note that the in-storage copy of the data set includes a 4K record area (76). Note, also, that the subsystem's virtual address space includes a "change area" (78) which is currently "nulled".

READ 2 PROCESSING

Figure 12B:
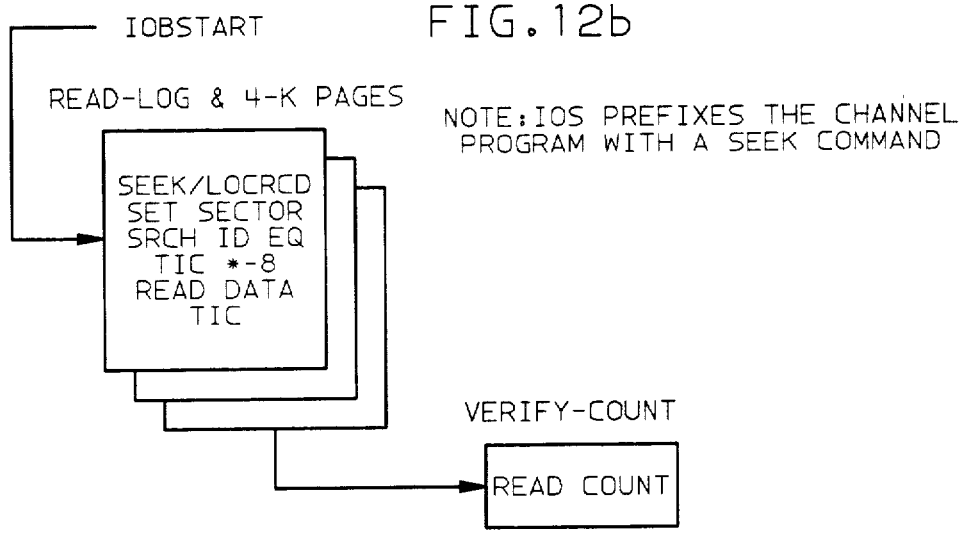
FIG. 12b is a flow chart showing the READ 2 processing operation.

READ 2 processing is performed by the KREAD2 routine in HASPCKPT. This routine will read any changed pages (as indicated by the specified CTLBs) and provide updates to the 4K data pages (4K records) from the journal. The KREAD2 routine uses the active size of the journal in the MASTER record to determine which one of the 4K records in the journal must be read. FIG. 12b shows that channel program that provides for READ 2. The CTLB control bytes control the reading and writing of the checkpoint 4K records. Likewise the CLCB control bytes (described herein) are used to indicate whether the journal 4K records should be written. There is one CTLB for each 4K record in the checkpoint data set, and one CLCB for each journal record. The CTLBs are located in the checkpoint MASTER record. CLCBs are located in the JES address space storage because they are local to this member and need not be communicated to other members.

Each member examines these bytes, and depending upon whether certain bits are set, either reads, writes, or ignores the corresponding record. Each byte has eight bits. One bit represents each of up to seven members in the complex. The eight bit has a special meaning, depending upon whether the record is an ordinary 4K record or a journal record. The bits are manipulated as follows.

When a member of the MAS gains control of the checkpoint data set, (i.e. during initial data set reads), that member scans the CTLBs to determine which bytes have the system affinity bit, that is the bit representing this member, set. If the member's bit is set in any record, it indicates that it must read that record. Once it has read the record, it turns off its bit. There is also a field in the MASTER record, the $CHLOGLN, which contains the number of bytes of the journal that are in use. This number must be converted into the number of journal records that it must read, by dividing by 4096 and rounding up to the nearest integer (number of records).

CTLBs are also manipulated when overwriting the updates from the journal. This process takes place during READ 2 post processing. As each updated control block is overwritten into its correct position in a 4K record, all eight bits in the record are set. The setting of these bits is used to indicate, to other members, that this record has been changed and must be read. Setting the member's bit indicates that it must write this record during a primary WRITE. Once it writes, it turns off the bit. It must also, during a primary WRITE, write any records which have the eighth bit of the CTLB set. Setting the eighth bit indicates to the next owner of the checkpoint that the new owner must also write this record to its 'to-be-written-to' version, i.e., whatever member does a primary WRITE of this record, will turn off the eighth bit. Whatever member does an intermediate or final WRITE of any record will turn off its own bit.

If a long HOLD period has been established, by way of parameter settings, it is possible that additional primary WRITEs will take place during the HOLD period. There will be one primary WRITE following every tenth intermediate WRITE in this checkpoint cycle, if the HOLD period is sufficient to allow ten intermediate WRITEs.

During update (HOLD) period, a member updates control blocks in a record by creating an entry in the change area. (This is done by building a CALE (described herein) for each update.) If the journal space is exhausted, (called a journal overflow), then the record is updated directly and all eighth bits are turned on. If the member's bit is on during HOLD or final WRITE processing, it indicates that it must write this record. Once the record is written, it turns off the bit (leaving all others set). Also, the eighth bit of the CTLB remains set to indicate that this journal record must be written at primary WRITE time. This is relevant only when additional primary WRITEs (as described above) are done during the HOLD interval.

Thus the bits are used to signal all the members that records must either read or written because they have been updated.

If the complex is operating in dual mode, the last bit may also be set if the updates cannot be contained in the 4K records that have been formatted for the journal.

Figure 10B:
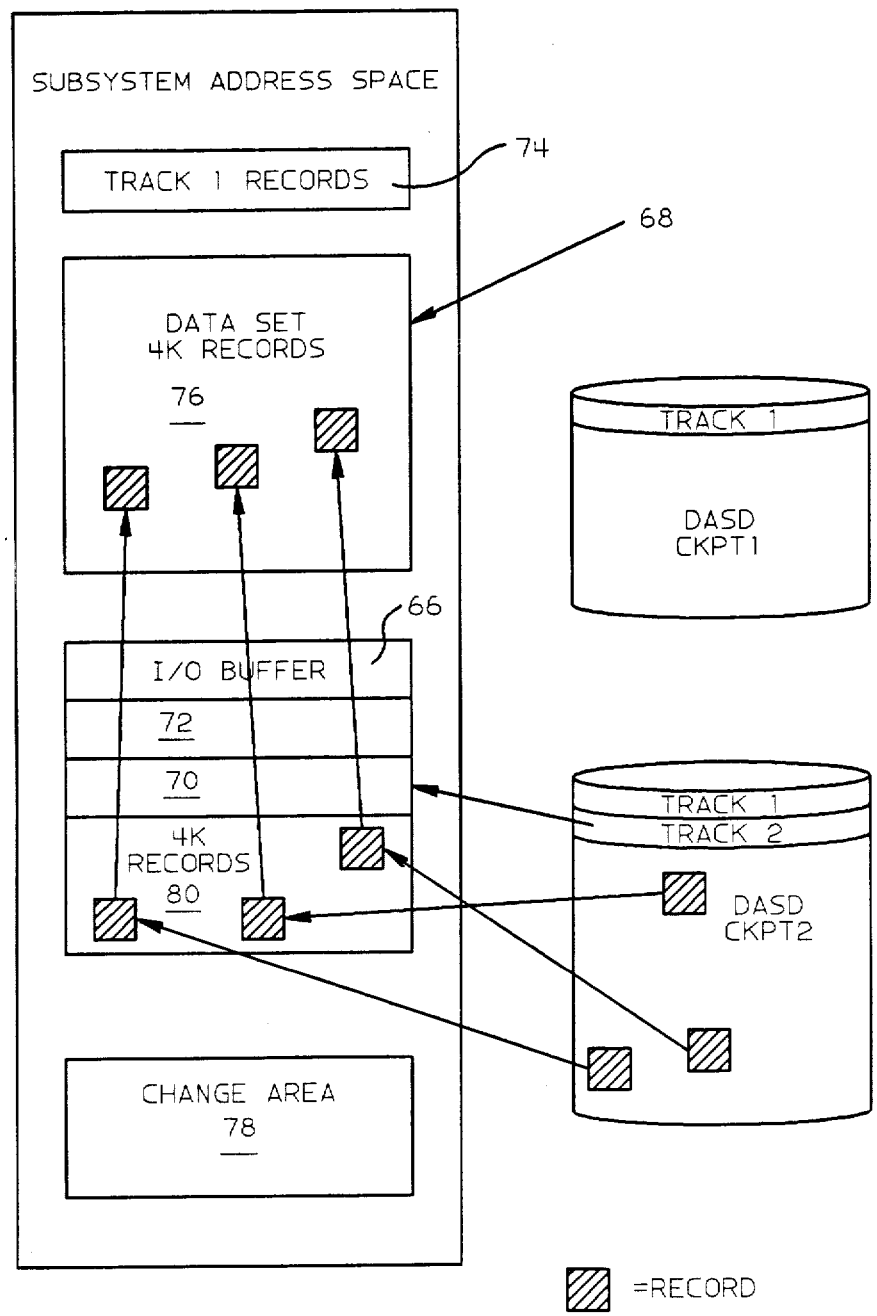

FIG. 10B shows conceptually the events that occur during the READ 2 processing. In this case, the CKPT2 version is the up-to-date version. First, journaled changes on track 2 of CKPT2 as well as any records in the 4K area on DASD that have been changed (as indicated by the corresponding CTLBs) are written to the first track region (70) and the 4K records area (80) of the I/O buffer (66) in storage. Second, the records previously written to the 4K records area (76) in the I/O buffer are now written to the 4K area of the in-storage checkpoint data set.

POST READ 2 PROCESSING

When READ 2 completes, a subroutine (KAFTRD2) will calculate the number of bytes in the journal, and the numer of control blocks in the journal. These calculations will be made when the journal, which has just been read to virtual storage, is used to update the 4K pages of the data set. In general, the KAFTRD2 routine is called after a read, to release and/or free pages and to overwrite journal updates. Code in this routine loops through the fixed list byte table to determine if the 4K record associated with the byte in the table is fixed or not. The actual 4K record will be released if KAFTRD2 was called following a "read". The newly read record will be moved from the I/O area to the actual 4K area.

The updates in the journal are "overwritten" to the I/O buffer copies of the 4K records in which the modified control blocks originally reside and then are overwritten to the in-storage copy of these records. This is part of the post processing of READ 2 in the KAFTRD2 routine.

The Change Log Address List Entries (CALEs), which are discussed herein, were copied into journal records when the journal was built. They are called Address List Entries (ALEs) after they have been copied into a journal record. These ALEs are interpreted by the KAFTRD2 routine which copies the modified control blocks from the journal records into their original position in the 4K pages of the checkpoint. After the KAFTRD2 routine completes, primary WRITE processing takes place for systems operating in dual mode.

PRIMARY WRITE PROCESSING

Records to be written during a primary WRITE are identified by their corresponding control bytes (CTLBs). The KAFTRD2 routine marks the corresponding byte for each record to which is 'written' journal updates, by setting bit X'80'. This bit could have been set for any of the following reasons:
1. A page was updated during this member's KAFTRD2 routine.

2. A page was updated by a previous member's KAFTRD2 routine.
3. A page was marked by a member due to journal overflow.
4. A page was marked by a member because it was updated.

Primary WRITE processing is performed by the KPRIMW routine in HASPCKPT which calls the KWRITE routine in HASPCKPT. HASPCKPT is in the subsystem address space. The KWRITE routine will write any changed pages (records) to the to-be-written-to checkpoint data set during the "write" portions of the checkpoint cycle if the complex is in dual mode. The KWRITE routine returns to the KPRIMW routine which then releases the I/O buffer pages, and increments a level number in the CHECK record (see FIG. 4). This level number is incremented after each primary WRITE operation. It is an indicator of the checkpoint version that is most up-to-date. In summary, during the primary write operation, one member incorporates the updates made by the previous member into the to-be-written-to version.

Figure 10C:
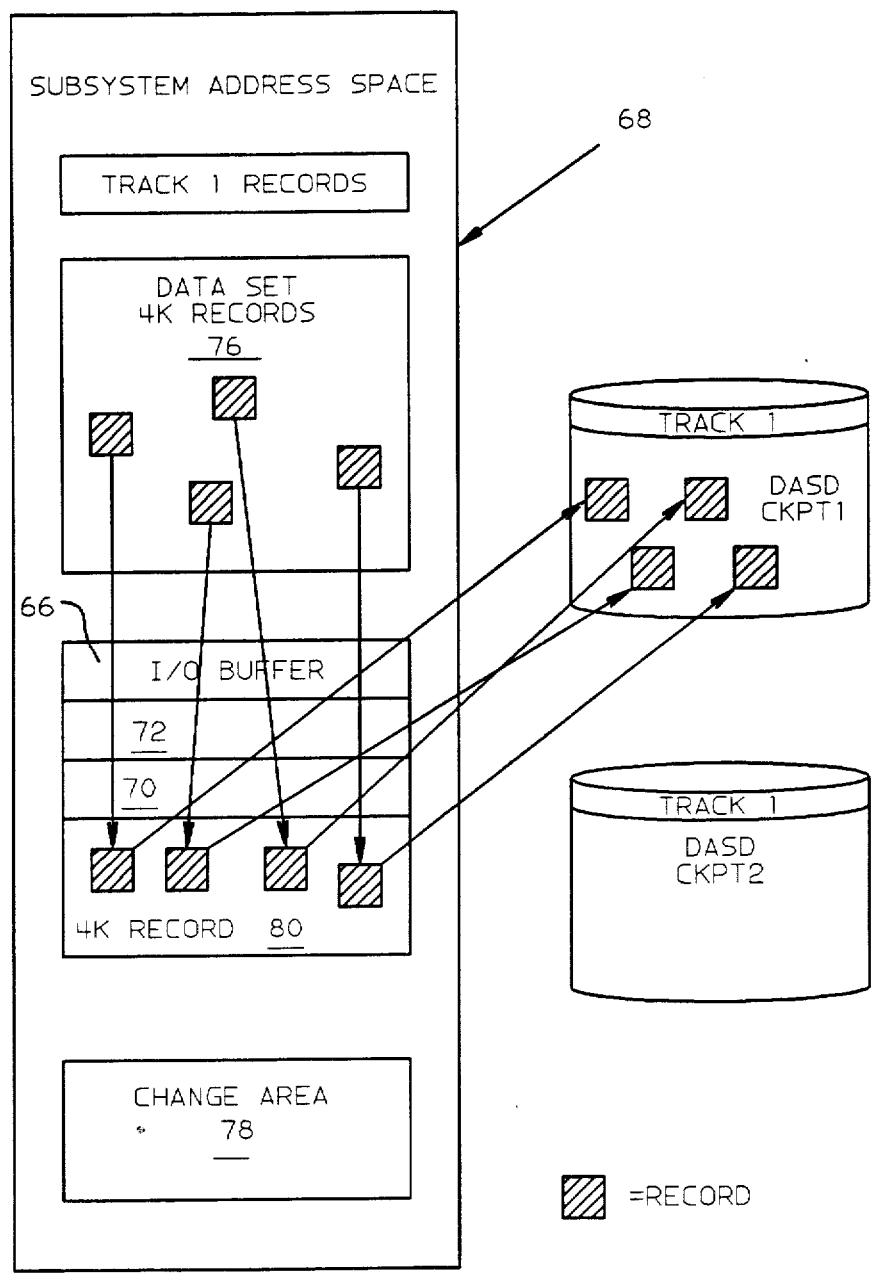
Figure 12C:
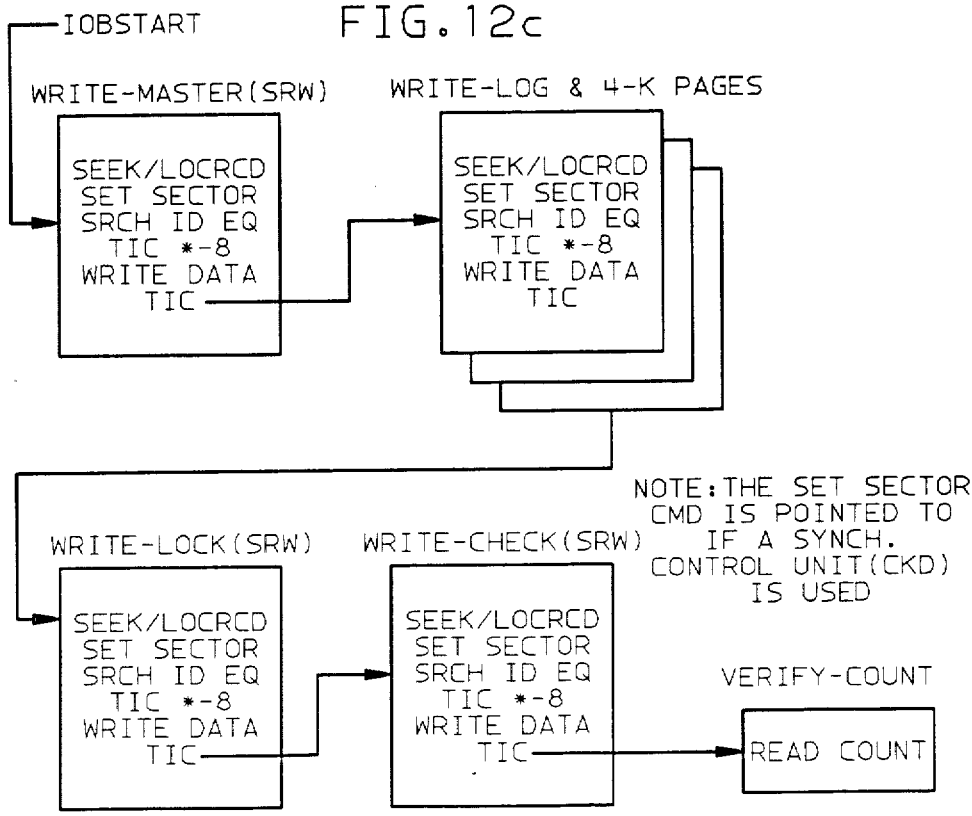
FIG. 12c is a flow chart showing the primary, intermediate and final WRITE processing operation.

FIG. 10C shows conceptually the events that occur during primary WRITE processing. The records in the 4K records area (76) of the in-storage data set that were changed by previous members, but not yet written to DASD, are now written (via the I/O buffer 66) to the 4K records area in the to-be-written-to version (CKPT1) on DASD. FIG. 12c shows the channel program that performs the primary WRITE processing.

INTERMEDIATE AND FINAL WRITE PROCESSING

The type of I/O operation that will follow a primary WRITE depends upon whether or not the HOLD timer interval has expired. When the checkpoint processor is again dispatched by the JES, it may do either final or intermediate WRITE operation, or neither. The HOLD interval is set by the user, or is defaulted before relinquishing ownership. If the HOLD interval has not expired, then the checkpoint PCE will initiate an intermediate WRITE operation, if required. Intermediate writes are initiated in response to a request by another JES processor or because a time interval has expired. In the latter case, the WRITE is initiated to maintain the integrity of the data. If the HOLD interval has expired, then a final WRITE operation will be started.

Each time a control block is updated, its status is recorded in the journal by building a Change Log Address List Entry (CALE) 51 and adding it to the current Change Log Address List (CAL) 55 in a journal record in storage as shown in FIG. 11. The CAL contains CALEs, which in turn, contain the offset from the start of the checkpoint data set of the updated element (control block), the length of the element, and the CTENT number (discussed below).

There is one CALE for each instance of an update to a checkpointed control block. There is a CAL for every n CALEs, depending upon the control block sizes.

A CALE is pointed to by a Page Address List Entry (PALE) 57. A PALE is built for each control block that has been updated, regardless of the number of times it was modified during this update cycle. The PALE, resides in a Page Address List (PAL) 59, and in turn, is pointed to by a Page Pointer List (PPL) 61. One PPL entry exists for each 4K page (record) in the checkpoint data set, and points to a PALE of an updated control block in this page. The PAL, PALE, PPL, and CAL are all located in the change area 78 in the subsystem's virtual storage address space. These control blocks are shown in FIG. 11 and found in the change area 78 shown in FIGS. 10A-D.

Figure 10D:
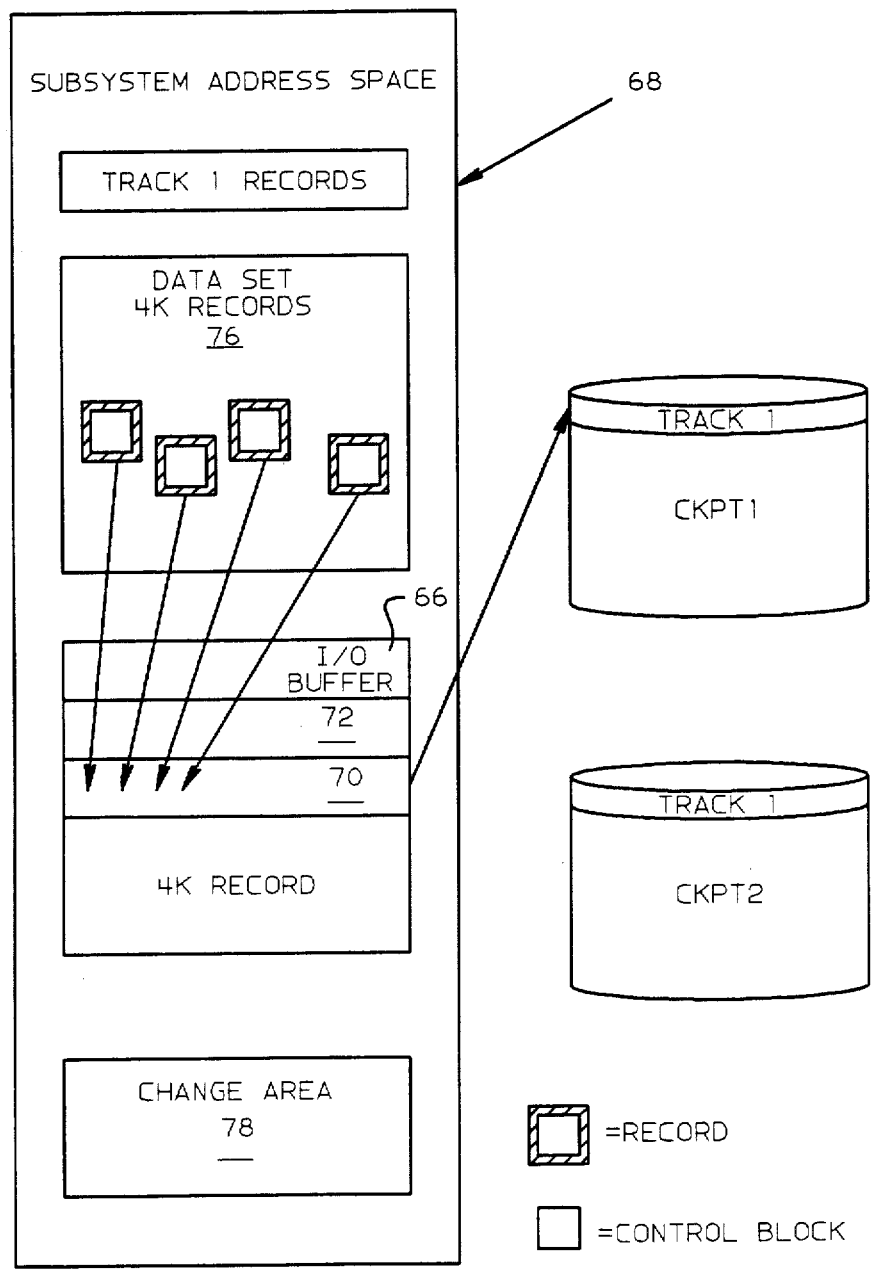

Before an intermediate or final write can be started, the journal records must be built from the CALEs (described above) in the change area (78). The journal is built by the KBLDCHLG routine in HASPCKPT. First this routine will search the CTLBs looking for records that have been marked as changed. For each checkpoint 4K record, there exists a PPL. If the record has been updated, its CTLB will have been marked, and there may exist at least one PALE (which corresponds to an updated control block within this record). These PALE(s) are pointed to by the PPL. The multiple updates to each control block are merged before the control block is copied to the journal as shown in FIG. 10D.

After merging multiple updates to each control block (if necessary), the journal is built from the CALEs in change area 78 (see FIGS. 10A-D). The latest level of each control block exists in the copy of the checkpoint data set that resides in virtual storage in the subsystem (JES) address space (68) of this member. For each CALE, the corresponding control block (and its CALE) is copied from the in-storage checkpoint copy to the journal, and the CLCB corresponding to the journal record is marked. The format of the journal records is shown in FIG. 5 and described above. The journal records are written to the to-be-written-to version in the first available area in its journal (in this case on track 1). There is a CLCB, for each journal record. These are analogous to the CTLBs for the other checkpoint records, and are used to indicate whether the journal record corresponding to the CLCB should be written to DASD. Control blocks can span multiple journal records. If the updated control blocks cannot be contained within the journal records, this is known as a journal overflow. There is code to handle this condition, should it occur. Essentially, updated control blocks that cannot be moved to the journal because it is full, will be written in their 4K pages (as in the prior art).

After the journal has been built, the storage for the CAL and CALE control blocks is freed.

If an intermediate WRITE or a final write is to be started, the appropriate CCW chain is built by the KBLDCCWS routine by chaining together the CCW packets, as shown in FIG. 12c.

Final WRITE processing is identical to intermediate write processing except that the storage for the PALs is freed, and the checkpoint data set is released (unlocked). This is accomplished by resetting the checkpoint lock. Then the KRELEASE routine in module HASPCKDS is called to remove the hardware lock. This is accomplished by using the system DEQUEUE service which results in a RELEASE request (see FIG. 8). This causes the execution of a channel program containing a RELEASE CCW, which resets the hardware lock as described above.

FIG. 10D shows conceptually the events that occur during intermediate and final WRITE processing. Based on the information provided in the CAL and PAL in the change area (78), control blocks are copied to the first track region 70 (or journal area) in the I/O buffer (66) and then written to the journal of CKPT1 on track 1 of DASD.

The to-be-written-to version (CKPT1) now becomes the to-be-read-from version of the checkpoint data set and the to-be-read-from version (CKPT2) now becomes the to-be-written-to version of the checkpoint data set. In other words, the versions "flip-flop".

CHANNEL PROGRAM

The channel programs, as shown in FIGS. 12a–c, are built, in the JES address space, according to the input control flags passed to the KTRK1IO routine (discussed above). (It is known in the art that an access method, i.e. a management routine that moves data between storage and DASD, builds channel programs for the I/O operations to occur. A channel program consists of a string of channel command words (CCWs) that describe the operation to the channel. For this embodiment, "channel program" can mean a group of CCWs that perform one I/O operation such as that shown in FIG. 12a or a group of CCWs that perform all I/O operations such as that shown in FIGS. 12a–c.). Generally, the channel program will locate the LOCK record, then, depending on the value of the LOCK record key, will either read the CHECK record and the MASTER and the track 1 portion of the journal or read the value of the CHECK record and the LOCK record data. If the value of the LOCK record key matches the value given on input, the LOCK record is written (set) to indicate ownership of the data set by the reading member of the complex. Otherwise, only the LOCK and CHECK records are read (and the lock is not altered). (IOBSTART in FIGS. 12a–c is a field in the CKB (described herein) that points to the start of that channel program.)

Figure 13:
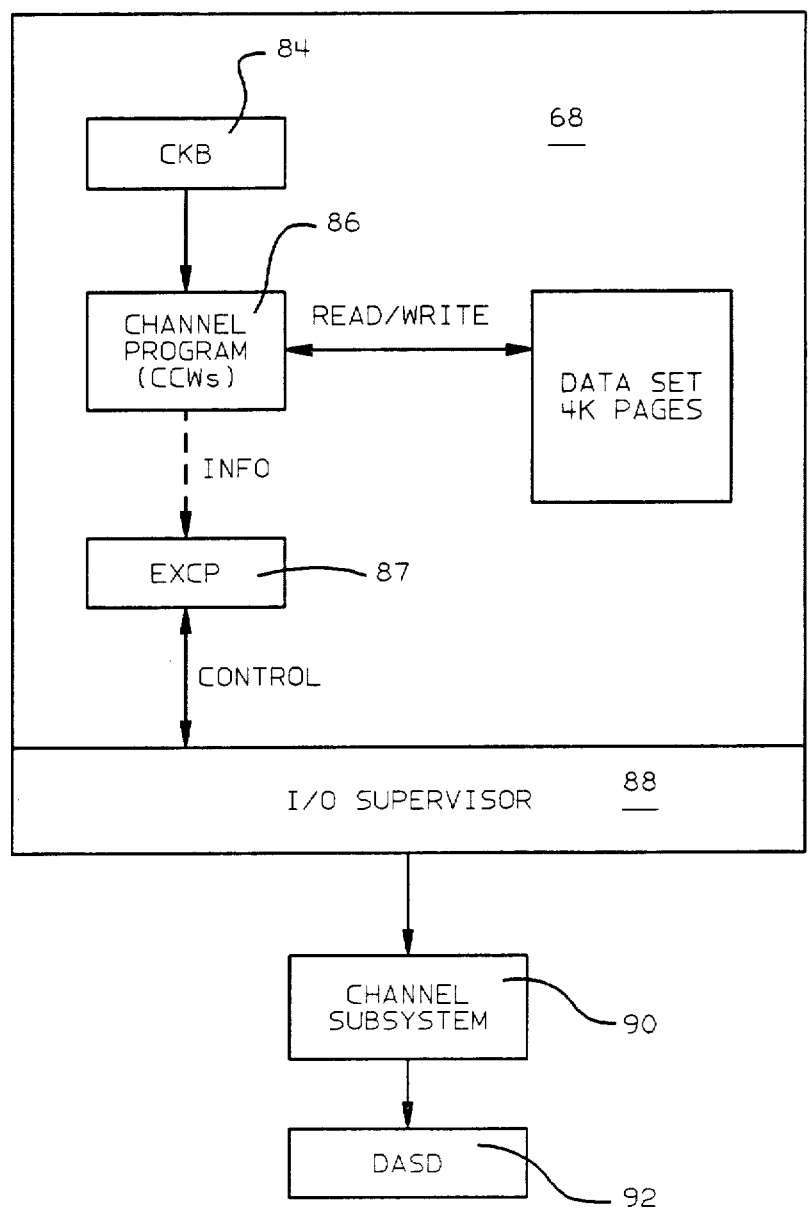
FIG. 13 is a schematic block diagram of the control blocks, channel command words and service routine provided for the subsystem in the virtual storage area.

FIG. 13 shows the location of CCWs in the address space provided for the (JES) subsystem in virtual storage. The access method builds several control blocks (CKB) 84, e.g. the I/O block, which is pointed to by general purpose register 1, and the event control block. The I/O block points to the channel programs 86 as well as other information that an execute channel program (EXCP) service routine (87) and the I/O supervisor (88) need to handle an I/O request (requested by the subsystem). The EXCP routine is invoked by the EXCPVR macro as a result of an I/O request. If the requestor invokes EXCP using the EXCPVR macro, the channel programs and buffers already reside in fixed storage and the buffer addresses within the CCWs of the channel programs are real addresses. The EXCP passes control to the I/O supervisor. The I/O supervisor (88) is the interface between I/O requests from the subsystem in address space 68 and the channel subsystem 90. (The EXCP 87 is the interface between the access method (not shown) and the I/O supervisor.) DASD (92) is connected to the I/O supervisor via the channel subsystem (90).

The READ 1 channel program (as shown in FIG. 12a) is designed to perform the reading of track 1 with minimum I/O service time. The channel commands are chained to read the CHECK, LOCK, MASTER and journal and rewrite and LOCK in sequence, i.e. in substantially a single rotation of the DASD device.

A channel program is built from a set of CCW commands chained together which perform a single I/O operation (READ, WRITE or SEARCH KEY) for a single record of a version of the data set. The CCW commands or "packets" are formatted depending on the type of DASD device on which the data set resides.

The channel program to "read" track 1 is shown in FIG. 12a. It is constructed by linking CCW packets. This channel program will require, on the average, 1.5 +c number of DASD revolutions to complete (where c is the partial revolution required to rewrite the LOCK record). The channel program shown in FIG. 12a will complete the "read" of the entire contents of track 1 if and only if the LOCK record key value is all zeroes. Otherwise, only the LOCK and CHECK data areas are read. In addition, the lock record is written if and only if the lock record key value is all zeroes. For the lock reset operation, the LOCK record key value (state) is compared against the value (state) originally set by the member holding the lock, and the LOCK value resets only if the key matches this value.

The LOCK record key value, as shown in FIG. 4, is written with four possible states, each state being a combination of settings of the 'me' and '1v' bytes within the key. The four possible states and their meanings are defined in the table below:

| ME | LV | Meaning |
|----|----|----|
| 00 | 00 | lock not held, version is to-be-read-from |
| 00 | 01 | depends on lock value of other version: a. If 00 00, lock not held, data set version is to-be-written-to. b. If 00 01, lock just obtained, version status must be determined from the "level" numbers. |
| 00 | 02 | Version is forwarded. (Forwarded version must be read to determine lock and level status.) |

Given the definitions of the possible states of the LOCK record key, the following table defines the LOCK key state transitions that may occur during a checkpoint cycle. Transisitions between the LOCK key states occur as the result of the lock record(s) being written during either READ 1, primary WRITE, intermediate WRIT or final WRITE:

| TRANSITION | ACTION |
|---|---|
| R1 | READ 1 transition. The LOCK key value is set to AL4(0, 01) and the SID is set to the reading member's SID if and only if the key value was read as all zeros. Otherwise there is no change to the LOCK key as a result of READ 1. |
| PW | Primary WRITE transition (done to the to-be-written-to data set). The LOCK record key value or state is left unchanged. The LOCK record data area is written with the "owning" member's SID and the updated level number. The number of the journal pages is set to 0. |
| IW | Intermediate WRITE transition (done to the to-be-written-to data set). If the complex is in dual mode, the number of journal pages is updated. |
| FW | Final WRITE transition (done to the to-be-written-to data set). The LOCK record key |

| TRANSITION | ACTION |
|---|---|
|  | value is set to AL4(0, 0), indicating that the lock is released. If the complex is in dual mode, the number of journal changes is updated. (AL4 (0, 0) is assembler syntax for two address constants each four bytes in length and each having a value of zero.) |
| ERR1/2 | The LOCK record key value is set to indicate that the data set is forwarded. The LOCK record key value becomes AL4(0, 2). |

The four defined values or states of the LOCK record key for each data set give rise to sixteen different combination of values when taken together. These possible combinations are referred to as LOCK record "states" for the checkpoint data set. (Some combinations are impossible given the definitions of the LOCK record transitions as defined above.) The following table lists the different lock record states and defines their meanings:

| # | CKPT1 | CKPT2 | Meaning |
|---|---|---|---|
| 1 | 00 00 | 00 00 | Lock unheld, both current (initial dual mode state). Level numbers indicate current data set. |
| 2 | 00 01 | 00 00 | Lock unheld, CKPT2 current. |
| 3 | 00 02 | 00 00 | Check forwarded data set to see if CKPT2 has been forwarded. |
| 4 | ME 00 | 00 00 | Impossible state. |
| 5 | 00 00 | 00 01 | Lock unheld, CKPT1 current. |
| 6 | 00 01 | 00 01 | Lock just obtained. Level numbers indicate current data set. |
| 7 | 00 02 | 00 01 | CKPT1 forwarded. |
| 8 | 00 00 | 00 02 | Check forwarded data set to see if CKPT1 has been forwarded, CKPT2 forwarded. |
| 9 | 00 01 | 00 02 | CKPT2 forwarded. |
| 10 | 00 02 | 00 02 | Both data sets forwarded. |

(Data set forwarding is used when checkpoint DASD reconfiguration is required.)

The following tables show the order in which the transitions defined above occur when the complex is in various modes. The table heading abbreviations are as follows:

| TRNS | Transition type |
|---|---|
| ID | The member ID (SID) written to the LOCK record |
| LEV# | The level number written to the CHECK record (data area designated as "level" in FIG. 4) |
| CL | The size (or number of records) of the journal that were written. |

The first table gives the order of transitions of the LOCK records for a checkpoint data set access in dual mode.

| TRNS | CKPT1 | ID | LEV# | CL | CKPT2 | ID | LEV# | CL |
|---|---|---|---|---|---|---|---|---|
|  | 00 00 | y | n | c1 | 00 01 | x | n−1 | c2 |
| R1 | 00 01 | A | n | c1 | 00 01 | x | n−1 | c2 |
| PW | 00 01 | A | n | c1 | 00 01 | A | n+1 | 0 |
| IW | 00 01 | A | n | c1 | 00 01 | A | n+1 | c3 |
| FW | 00 01 | A | n | c1 | 00 00 | A | n+1 | c4 |
| R1 | 00 01 | A | n | c1 | 00 01 | B | n+1 | c4 |
| PW | 00 01 | B | n+2 | 0 | 00 01 | B | n+1 | c4 |
| IW | 00 01 | B | n+2 | c5 | 00 01 | B | n+1 | c4 |
| FW | 00 00 | B | n+2 | c6 | 00 01 | B | n+1 | c4 |

The second table gives the order of transitions of the LOCK records for the forwarding of a checkpoint data set due to any error. (ERR2 means that an error occurred on CHPT2 and ERRCKPT2 is the forwarded data set. A and B in each "ID" column refer to members A and B of the complex. The different update level numbers are referred to as n−1, n, n+1 and n+2. The number of records in the journal at the different transitions (READ 1, primary WRITE, etc.) are identified as C1, C2, C3, C4, C5 and C6.)

| TRNS | CKPT1 | CKPT2 | ERRCKPT2 | MEANING |
|---|---|---|---|---|
|  | 00 00 | 00 01 |  | Lock unheld, CKPT1 current. |
| R1 | 00 01 | 00 01 |  | Lock obtained. WRITE error on CKPT2. |
| ERR2 | 00 01 | 00 02 | 00 01 | CKPT2 forwarded. |
| P/IW | 00 01 | 00 02 | 00 01 | ERRCKPT2 made current. |
| FW | 00 01 | 00 02 | 00 00 | Lock released, checkpoint cycle complete. ERRCKPT2 is current. |
| R1 | 00 01 | 00 02 | 00 01 | Lock obtained. |
| PW | 00 01 | 00 02 | 00 01 | ERRCKPT2 updated. |
| IW | 00 01 | 00 02 | 00 01 | Lock shown on CKPT1. |
| FW | 00 00 | 00 02 | 00 01 | Lock released. |

The READ 1 at the sixth transition (above) will find that the CKPT2 data set has been forwarded. At this point a second channel program to perform READ 1 will be initiated to the forwarded data set (ERRCKPT2) to determine the actual lock state. The second channel program will set the lock on ERRCKPT2 and complete the checkpoint cycle as in a normal access. The RESERVE is still held for CKPT1 preventing other members from accessing either CKPT1 or CKPT2.

Channel programming is thoroughly discussed in a paper presented to the IBM user's group SHARE 66 meeting (session 0335) by Donald C. Hahn.

BUILDING CCW PACKETS

Several routines process the building and setting of the CCW packets necessary to perform the various required I/O operations to the checkpoint data set. The required I/O operations on the checkpoint data set include read, write and format write. ("Format writing" is the process of initializing the checkpoint data set.) The CCW packets are segments of the channel program that perform a specific function, such as reading a 4K record. These are combined to form a complete channel program that controls the entire I/O operation, such as a READ 1 I/O or a final WRITE, etc.

JES I/O processing makes use of the CKB (84), as shown in FIG. 13, as a data area for I/O operation control, and will add to and restructure the format of the CKB as required. Separate CKBs (one for each checkpoint data set), containing only the READ 1 channel program CCW packets, as shown in FIG. 12a, and all required I/O data areas, will be formatted. A single set of CCW packets for the regular 4K records (and all track 1 and journal records) will be built and formatted separately from the CKBs for the READ 1 CCWs.

The KBLDCKB routine, in a module in the subsystem address space (68), is responsible for acquiring, building (initial formatting), and page fixing the CKB. It is invoked primarily from JES initialization. The size of the CKB depends on the size of the journal and the number of 4K records contained in the checkpoint data set versions. The number of 4K records depends on the sizes of the various JES control blocks and the numbers of them, as defined by parameters and CTENTs in JES initialization processing (described below). The caller of the KBLDCKB routine is responsible for ensuring that all I/O requests using the CKB are complete prior to the call.

For a READ 1 I/O operation, the I/O control blocks for the checkpoint versions are set, and the CCW packets for the READ 1 channel program are set to required values depending on the type of READ 1 to be performed.

For a READ 2, primary WRITE, intermediate WRITE or final WRITE I/O operation, CCW packets are built for the 4K records to be read or written. These channel programs will be simpler (search then read-or-write 4K of data for each record) than the READ 1 channel program that must analyze the LOCK record and also re-write it. The KBLDCCWs routine is called to build these CCW chains. A "loop" runs (backwards) through all of the I/O area control bytes searching for "reads", and through the actual control bytes for "writes", checking if the 4K record associated with the byte has changed or not. The CCW packets will then be set to read the selected 4K records into the I/O buffer in storage from the DASD version, or write updated records from the I/O buffer to the DASD version.

PROCESSING TO INCLUDE CHECKPOINT INITIALIZATION

The JES source (initialization) module (HASPIRDA) in the subsystem address space contains the code that initializes the JES checkpoint structure when the JES address space is created in virtual storage. HASPIRDA defines and builds the control block structures which are used in managing and accessing the checkpoint data set. HASPIRDA allocates and initializes the checkpoint storage devices that JES uses during its processing. JES uses DASD and DASD control unit devices as checkpoint hardware media. After HASPIRDA completes the checkpoint initialization, the processing described earlier can be accomplished. HASPIRDA is usually deleted from storage following initialization.

The checkpoint initialization processing is performed in the following order. The HASPIRDA module performs other processing not required for checkpoint data set initialization. This processing is excluded from this description of HASPIRDA checkpoint processing.

Figure 14:
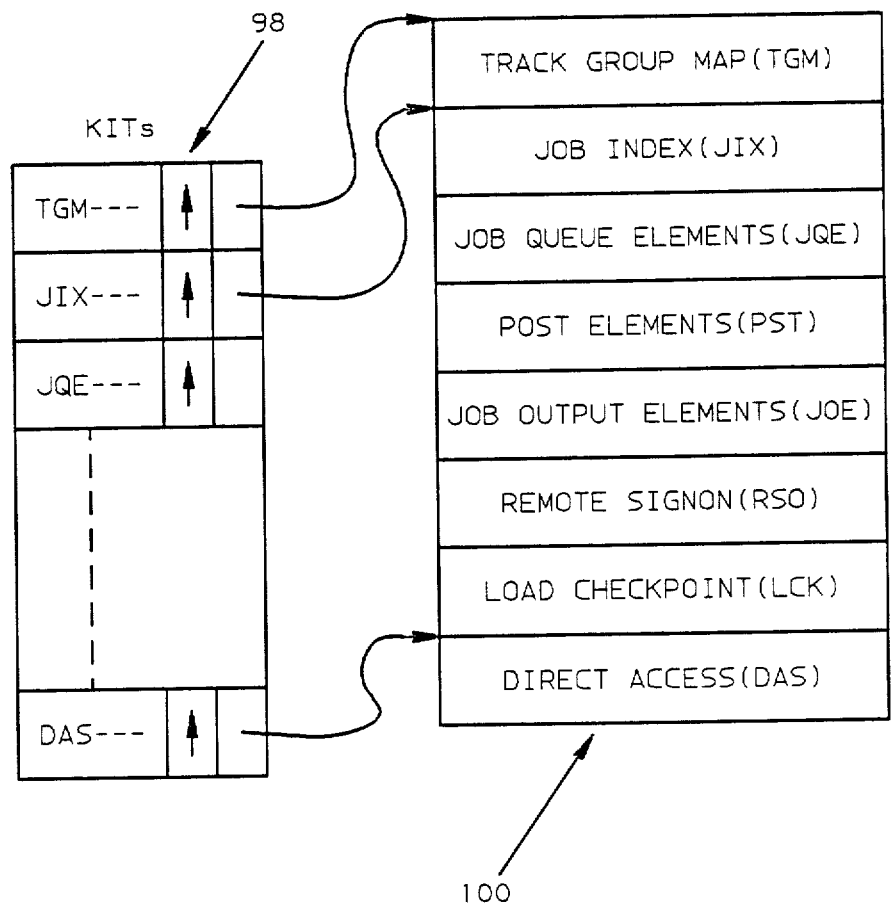
FIG. 14 is a schematic block diagram that shows the mapping of the storage configuration of the logical areas of the data set by checkpoint information tables.

A routine (KBKDKIT) in HASPIRDA is called to build the checkpoint information tables (KITs) 98 as shown in FIG. 14 based on the data contained in the CTENTs 100 which define the logical areas in the checkpoint data set. (A KIT contains information which will describe the key characteristics of a logical area of the checkpoint data set, i.e. the number of records (4K pages), offsets, etc.) Each logical area of the checkpoint data set contains a distinct type of control block and begins on a record boundary. For example, a CTENT which contains the definition of the job queues (JQEs) begins on a record boundary and spans as many checkpoint 4K records as required to contain the job queue. A different CTENT defines the output queue which will also begin on a record boundary. There is one CTENT for each logical area of the checkpoint data set. The routine first gets a block of storage (using well-known storage management services to obtain storage that can be addressed by JES), then processes each CTENT and builds a corresponding KIT. Each KIT is initialized with the following information from the CTENTs: the identifier, the length of the checkpoint logical area element, the offset into the checkpoint of the element origin (in 4K pages), the KIT flag byte, offset into the checkpoint logical area of the first checkpoint element, offset of the beginning checkpoint control byte for the checkpoint logical area, and the size of the checkpoint logical area (bytes). The size of the ligical area is usually defined using parameters that are specified by the user. FIG. 14 shows that the KITs give a complete mapping of the storage configuration of the checkpoint logical areas of the checkpoint data set. Each individual KIT maps one of the checkpoint logical areas. The checkpoint data set currently has eight checkpoint areas, as shown in FIG. 14, defined by the CTENTs in HASPIRDA. Each checkpoint area contains control information or queuing elements which must be shared in the checkpoint data set by the multi-access spool computer complex members. When new shared data is required, an additional CTENT can be added to HASPIRDA to define a new checkpoint logical area containing the shared data.

Code loops through the KITs and determines the number of I/O control bytes needed (CTLBs). The number is equivalent to the number of 4K pages in the checkpoint data set (excluding the journal).

FIGS. 15A through 15D show how a control byte (CTLB) 102 corresponding to a 4K page is changed as "ownership" of the checkpoint cycle changes. FIG. 15A shows the CTLB following the updating of the 4K page, in the checkpoint data set, that corresponds to this CTLB. The page was updated by member V. Member V's bit is off indicating that it does not need to reread this record. Member Y became the "owner" of the checkpoint data set, read the MASTER record and found that its bit was set in this CTLB. Member Y then read the record corresponding to this CTLB during a READ 2 operation and then set its bit in the CTLB to zero as shown in FIG. 15B. (Member Y did not update the data set.) Member T obtained "ownership" of the checkpoint data set, read the MASTER record and found that its bit was set in this CTLB. Member T then read the record corresponding to this CTLB and then set its bit to zero as shown in FIG. 15C. (If, for example, member V had obtained "ownership" instead of member T, member V would not have read the record corresponding to this CTLB since its bit is "off" (zero) as shown in FIG. 15C.) If member T had made changes in the corresponding page while it owned the checkpoint data set, the other members U, W, X and Z (now that their bits are set as shown in FIG. 15D) will subsequently read all of the changes made by members V and T in one record (corresponding to this CTLB).

A check is made to determine if the size of the journal was not provided to JES via a initialization parameter. If the size was not provided, the size is then set to one fourth the size of the checkpoint, i.e. one fourth of the number of CTLBs.

The size of the MASTER record is calculated by adding together the sizes of its various elements. The MASTER record contains general control information used to control the JES multi-access spool environment and the checkpoint data set. This information is frequently changed and accessed by multi-access spool members and is maintained on track 1 of the checkpoint data set to optimize performance of the JES complex. In particular the MASTER record contains the shared queue control elements (QSEs) and all the KITs and CTLBs. A QSE, which is located in the MASTER record, is provided for each member of the complex and contains the complex ID, the complex status information, the time-stamp for the last checkpoint cycle as well as other status data.

Routine (KBLDCB) in HASPIRDA is called to build and initialize the control blocks needed for checkpoint processing. First, storage for the 4K pages and CALs is allocated and appropriate pointers and fields are set. The track 1 table in HASPIRDA defines the information (data) which will be stored on the first track of the checkpoint DASD. FIG. 4 describes the format and information which resides on the first track of the checkpoint data set.

The CKPTALOC in HASPCKDS routine (which is in the subsystem address space) will be called in order to allocate the checkpont DASD data sets required for checkpoint processing. This routine is called once to allocate each checkpoint data set version. A cold start is only allowed to proceed if the checkpoint data set cannot be read or the information in the data set indicates that no members are active and the operator of the JES complex confirms this. A cold start of the JES complex is done when the JES complex is being created. After a cold start of JES, the JES work queues in the checkpoint data set will be initially empty and JES will wait for the input of work into the JES complex. A cold start is performed only by the first member entering the JES multi-access spool complex. All subsequent starts will be called "Warm Start" with the work queues in the checkpoint data set already initialized and containing work to be performed. During a warm start, JES will validate the checkpoint data set to ensure checkpoint versions are valid. A warm start will be allowed to continue if the "reads" to the checkpoint data set are successful. The routine attempts to dynamically allocate and OPEN the checkpoint data set versions.

The routine (CKBINIT) in HASPIRDA is called to allocate the storage for the CKB as well as the journal and the CLCBs. CKBINIT is called once for each checkpoint data set version. The CLCBs are used to indicate which of the journal records are active. They pertain to journal records and are analogous to the CTLBs for 4K records described earlier. There is one CKB for each checkpoint data set containing buffer control information, status flags, data necessary for completing I/O operations and CCWs used in READ 1 processing. Once the CKBs are set up, another routine is called to build the CKC. The CKC contains the CCW packets for initiating the I/O for any record of the checkpoint data set.

The CKB is set to indicate that initialization is in progress. A RESERVE is issued against the CKPT1 version. The routine KTRK1IO in HASPCKPT will be used to software lock the data set and to read the data on track 1 of the checkpoint versions. The data read from track 1 of the two versions is then verified. A check is made to assure the MASTER record size calculated from parameters, etc. matches the MASTER record size read from DASD. A check is also made to see if the specifications recorded in the MASTER record for the two versions (CKPT1 and CKPT2) are the same in both versions and that it agrees with information supplied when JES was started.

If any I/O errors are encountered during the initialization process or if the checkpoint data set versions fail any of the error checking that is being done, the initialization process will be halted and operator dialog routines will be entered to determine the correct data set versions to be used to correct the problems encountered. If the system operator indicates the error can be corrected, the version in error will be deallocated and the new/correct version will be allocated, locked (hardware and software) and track 1 will be read as described above. In essence, checkpoint initialization will be restarted.

A warm start is a restart of JES while maintaining the state of the checkpoint data set queues as they were prior to the "stoppage". The validity checking remains substantially the same as in the prior art. For example, the QSE tables are validated by the routine NGCIRCHK. On a warm start, if the size of the journal indicated in the MASTER record differs from the size specified at initialization, the routine CKBINIT is again called to rebuild the CKB and obtain a new journal. This allows dynamic changes to the size of the journal to optimize performance. The control bytes (CTLBs) are set to indicate all of the pages that need to be read and the routine KTRK1IO is called to read all of the 4K journal pages on track 1. Then the entire current version of the data set, as determined by KTRK1IO from the LOCK and CHECK records, is read by calling the KREAD2 routine (with the exception of track 1 which was previously read). At this point the data in the entire checkpoint data set is resident in the virtual storage of the JES address space. This is the "in-storage" copy of the checkpoint data set. Any journal information (data) which has not been used to "overwrite" the in-storage data set copy is now used to overwrite the copy of the data set in the change area in storage.

A cold start is a restart of JES that empties the queues and destroys all work (yet to be run as well as in-progress work). Since the queues will be initialized to an "empty" state, the 4K segment of the checkpoint data set need not be read, as was done for a warm start. The virtual storage copy of the checkpoint 4K pages are formatted to their initial state.

The member's checkpoint control bytes are reset to indicate that this member has read all changed pages. The lock record data fields are set for the format write. A format write will write the entire checkpoint data set to DASD. The check value is set in the CKB. The CCW chains and their data packets are set for a format write. Two calls are made to KFORMAT, to format write the two checkpoint data set versions. The down level version will be written first to ensure the integrity of the most current checkpoint data set information.

After the successful write is verified, the other version of the data set will be updated (written to).

At this point the checkpoint data set environment has been initialized and control is returned to the caller of the HASPIRDA module. The checkpoint cycle, which was described above, can now proceed.

While the invention has been particularly shown and described with references to preferred embodiments thereof, it will be understood by those skilled in the art that the foregoing and other changes in form and details may be made therein without departing from the spirit and scope of the invention.

What is claimed is:

1. In a multiplexed data area computer complex including processors, main storage having program address spaces, at least one non-volatile storage device connected to said main storage, at least one subsystem in one of said program address spaces in said main storage and shared status data stored in fields in a predetermined area in said main storage for each of said processors, the apparatus for communicating subsystem status among said processors comprising:
  a single, shared to-be-read-from version of said shared status data including a first storage area formatted on said storage device, said first storage area including records for containing changed data fields,
  a single, shared to-be-written-to version of said shared status data including a second storage area formatted on said storage device, said second storage area including records for containing changed data fields, and
  a program in one of said processors or address spaces for updating subsystem status on said to-be-written-to version by performing output operations on said to-be-written-to version and input operations on said to-be-read-from version when one of said processors solely controls and has access to said shared data, said operations comprising:
  means for reading from said first storage area and overwriting portions of said shared status data in said predetermined area with data in said changed data fields read from said first storage area,
  means for reading only changed ones of said records in said to-be-read-from version and overwriting said shared status data in said predetermined area with said changed ones of said records,
  means for writing said one of said changed records in said shared status data in said predetermined area to said to-be-written-to version,
  means for recording in-progress updates to said data fields in said predetermined area corresponding to one of said processors that solely controls and has access to said shared status data in said predetermined area,
  means for writing in-progress updates that have been written to said shared status data in said predetermined area to said to-be-written-to version,
  means for flip-flopping said to-be-read-from version to said to-be-written-to version and said to-be-written-to version to said to-be-read-from version following said input and output by said solely controlling processor, and
  means for repeating said operations with a subsequent one of said processors controlling and having access to said shared status data.

2. In a multi-access spool computer complex including processors, main storage, at least one direct access storage device (DASD) connected to said main storage, a subsystem in an address space in said main storage and a checkpoint data set stored in a predetermined area in said main storage containing control blocks for each of said processors, the improvement comprising:
  a single, shared to-be-read-from version of said checkpoint data set including a first journal formatted on a track of a DASD, said first journal including records for containing changed control blocks,
  a single, shared to-be-written-to version of said checkpoint data set including a second journal formatted on a track of a DASD, said second journal including records for containing changed control blocks, and
  a channel program in said address space for performing input/output operations on said versions when one of said processors solely controls and has access to said checkpoint data set, said operations comprising:
  means for reading from said first journal and overwriting portions of said checkpoint data set in said predetermined area with data read from said first journal,
  means for reading only changed ones of said records in said to-be-read-from version and overwriting records in said checkpoint data set in said predetermined area with said changed ones of said records,
  means for writing said ones of said changed records in said checkpoint data set in said predetermined area to said to-be-written-to version,
  means for recording the status of in-progress updates to control blocks in said checkpoint data set corresponding to said one of said processors that solely controls and has access to said checkpoint data set in said predetermined area,
  means for writing in-progress updates that have been written to said checkpoint data set in said predetermined area to said second journal in said to-be-written-to version,
  means for flip-flopping said to-be-read-from version to said to-be-written-to version and said to-be-written-to version to said to-be-read-from version following said input/output operations by said solely controlling processor, and
  means for repeating said operations with a different one of said processors controlling and having access to said checkpoint data set.

3. In a multi-access spool computer complex including processors, main storage, at least one direct access storage device (DASD) connected to said main storage by a channel subsystem, a subsystem in an address space in said main storage and a checkpoint data set stored in a predetermined area in said main storage containing control blocks for each of said processors, the method for communicating subsystem status among said processors comprising the steps of:
  creating a single, shared to-be-read-from version of said checkpoint data set including a first journal formatted on a track of a DASD, said first journal including records for containing changed control blocks, and a single, shared to-be-written-to version of said checkpoint data set including a second journal formatted on a track of a DASD, said second journal including records for containing changed control blocks, and
  executing a channel program in said address space for performing input/output operations on said versions when one of said processors solely controls and has access to said checkpoint data set, said operations comprising the steps of:

reading from said first journal and overwriting portions of said checkpoint data set in said predetermined area with only changed data read from said first journal, reading only changed ones of said records in said to-be-read-from version and overwriting records in said checkpoint data set in said predetermined area with said changed ones of said records, writing said ones of said changed records in said checkpoint data set in said predetermined area to said to-be-written-to version, recording status information of in-progress updates to control blocks in said checkpoint data set corresponding to said one of said processors that solely controls and has access to said checkpoint data set in said predetermined area, writing in-progress updates that have been written to said checkpoint data set in said predetermined area to said second journal in said to-be-written-to version, flip-flopping said to-be-read-from version to said to-be-written-to version and said to-be-written-to version to said to-be-read-from version following said input/output operations by said solely controlling processor, and repeating said operations with a different one of said processors controlling and having access to said checkpoint data set.

4. The multi-access spool computer complex of claim 3 in which said status of in-progress updates is recorded in a change area on said address space.

5. The multi-access spool computer complex of claim 2 in which control bytes having bits each corresponding to a processor in said complex control said I/O operations on said versions.

* * * * *